(12) United States Patent
Mase et al.

(10) Patent No.: US 7,887,393 B2
(45) Date of Patent: Feb. 15, 2011

(54) MOVING MECHANISM FOR BLAST GUN FOR BLASTING MACHINE

(75) Inventors: Keiji Mase, Edogawa-ku (JP); Ryoji Kikuchi, Edogawa-ku (JP)

(73) Assignee: Fuji Manufacturing Co., Ltd., Edogawa-ku, Tokyo (JP)

( * ) Notice: Subject to any disclaimer, the term of this patent is extended or adjusted under 35 U.S.C. 154(b) by 364 days.

(21) Appl. No.: 12/148,879

(22) Filed: Apr. 22, 2008

(65) Prior Publication Data
US 2008/0268757 A1 Oct. 30, 2008

(30) Foreign Application Priority Data
Apr. 25, 2007 (JP) .............................. 2007-116085

(51) Int. Cl.
B24B 49/00 (2006.01)
(52) U.S. Cl. .......................................... 451/11; 451/89
(58) Field of Classification Search ...................... 451/5, 451/11, 89
See application file for complete search history.

(56) References Cited

U.S. PATENT DOCUMENTS

| | | | | |
|---|---|---|---|---|
| 4,064,656 A | * | 12/1977 | Zeidler | 451/89 |
| 4,947,702 A | | 8/1990 | Kato | |
| 5,233,795 A | * | 8/1993 | Reas | 451/38 |
| 5,762,538 A | * | 6/1998 | Shaffer | 451/36 |
| 6,004,190 A | * | 12/1999 | Trampusch | 451/89 |
| 6,368,417 B1 | * | 4/2002 | Weber | 134/7 |
| 6,732,424 B2 | * | 5/2004 | Nadicksbernd | 29/722 |

FOREIGN PATENT DOCUMENTS

| | | | |
|---|---|---|---|
| EP | 1702717 A1 | * | 9/2006 |
| EP | 1905553 A1 | * | 4/2008 |
| JP | 2003-251126 | | 9/2003 |

\* cited by examiner

*Primary Examiner*—Maurina Rachuba
(74) *Attorney, Agent, or Firm*—Merchant & Gould P.C.

(57) ABSTRACT

Provided is a moving mechanism for a blast gun which can easily move a blast gun accommodated in a blasting chamber and which can easily perform other operations from the outside thereof without leaking dust. A plurality of arm members (first input arm 21, second input arm 22, first output arm 31, and second output arm 32) are interlocked to form an input arm 20 and an output arm 30, each having one pair of arm members, one arm of the two arm members is pivotally attached to the other arm so as to be rotatable around an interlocked portion serving as a fulcrum, the input arm 20 is disposed outside the blasting chamber 3, and the output arm 30 is disposed inside the blasting chamber 3. In addition, the input arm 20 and the output arm 30 are interlocked to each other by an interlocking unit 40 which penetrates a top plate of a cabinet 4, and a power transmission mechanism is provided which rotates the second arm 22 synchronously with the rotation of the input arm 20, so that a blast gun 5 fitted to the output arm 30 can be moved by operating the input arm 20.

14 Claims, 13 Drawing Sheets

MOVING MECHANISM FOR BLAST GUN FOR BLASTING MACHINE

BACKGROUND OF THE INVENTION

1. Field of the Invention

The present invention relates to a moving mechanism for a blast gun for a blasting machine, and more particularly relates to a moving mechanism for a blast gun which is disposed inside and outside a blasting chamber and which moves the blast gun in a desired movement trajectory pattern, the blast gun having a nozzle which ejects a mixed fluid, composed of a compressed gas and an abrasive, on a surface of a workpiece (hereinafter, the surface and the workpiece are collectively called "workpiece surface") which is to be subjected to machining or processing (hereinafter simply referred to as "processing"). In addition, some models have a blast gun provided with a trigger which is operated to eject and stop the mixed fluid or a foot pedal which is operated instead of the trigger.

2. Description of the Related Art

Blasting machines ejecting an abrasive together with compressed air are used for applications such as polishing or cutting of various goods, deburring for electronic components, and surface cleaning; in addition, blasting machines may also be used for various applications in a range of fields. For example, when spherical shots are used as an abrasive to be ejected, a blasting machine may be used for shot peening treatment.

In this specification, the "abrasive" includes one type of various powders, particles, fluid, and the like, which are ejected by a blasting machine, or a mixture thereof, the powders and the particles having desired particle diameter, shape, material, hardness, and elasticity. In addition, in order to perform desired processing, besides abrasive grains used, for example, for cutting, grinding, and polishing of workpiece surfaces, the abrasive includes resin particles or pulverized seed shells, used for surface cleaning or the like, and metal spheres used for the shot peening described above as well as blasting, a material having a grid shape or ceramic spheres are also included. In addition, the blasting machine of the present invention includes various suction-type and direct-pressure type machines which can be used for the various applications described above.

In order to prevent a degradation in the working environment caused by the abrasive, a crushed powder thereof generated by ejecting, and dust such as a cut powder generated from workpiece surfaces, the blasting machine described above is configured such that the workpiece and the blast gun are accommodated in a blasting chamber formed inside a cabinet and the abrasive is ejected in this blasting chamber.

In addition, various proposals have been made in order to move the blast gun accommodated in the blasting chamber in accordance with the shape of a workpiece surface or a portion to be processed, and/or in order to perform various operations, such as an operation for changing an ejecting direction.

The simplest structure for operating the blast gun described above has an opening for operation formed in a front or a side surface of the cabinet defining the blasting chamber so that an operator can insert his or her hand through this opening. In this structure, the blast gun is held by the hand inserted into the blasting chamber through the opening for operation and is moved and operated manually in accordance with the shape of the workpiece surface, the portion to be processed, or the like so as to perform desired processing.

In addition, a blasting machine having a driving device or the like which moves a blast gun disposed in a blasting chamber has also been proposed. As one example, a machine has been proposed in which, in order to enable a blast gun provided with a pipe extending to the outside of a blasting chamber to move in the blasting chamber, a slit is formed in a top plate of a cabinet through which the pipe is inserted, and a moving mechanism moving this blast gun in a longitudinal direction of the slit is provided outside the blasting chamber (Japanese Unexamined Patent Application Publication No. 2002-52471).

Furthermore, besides the blasting machines described above, a blasting machine having a structure in which an entire driving mechanism for a blast gun is disposed in a blasting chamber has also been proposed. An example of this type of blasting machine is one in which a robot for operating a blast gun is disposed in a blasting chamber.

Among the related arts described above, in the method in which an operator's hand is inserted into the blasting chamber through the opening for operation, in order to prevent the dust generated in the blasting chamber from leaking outside through the opening for operation, when the opening for operation is sealed off, for example, by a rubber glove into which the operator's fingers are inserted, and the operator holds the blast gun through the glove sealing off this opening for operation, the airtightness of the blasting chamber is maintained, and hence the dust is prevented from leaking outside the machine.

In the method described above, although the dust is prevented from leaking outside the blasting chamber, the blast gun disposed in the blasting chamber is operated only manually, and hence this type of machine is not suitable for performing operations for mass processing or the like, in which the blast gun is repeatedly and continuously made to perform a fixed movement.

On the other hand, according to the structure in which the driving device is provided in the blasting chamber, when the blast gun is moved by the driving device in accordance with a predetermined motion, the same operation can be repeatedly and continuously performed; therefore, this type of blasting machine is suitable, for example, for mass processing of identical products.

However, according to the blasting machine having the above structure, the slit formed in the cabinet must be larger than the pipe diameter in order to ensure a movable region of the blast gun in the blasting chamber, and hence anti-dust measures must be taken in order to prevent the dust from leaking outside the machine through this part.

As the anti-dust measures, in the blasting machine disclosed in Japanese Unexamined Patent Application Publication No. 2002-52471, short rubber split curtains are hung at the above slit portion, through which the pipe communicating with the blast gun is inserted, so as to surround the pipe, thereby preventing the dust from leaking through the slit portion (FIGS. 2 and 3 of Japanese Unexamined Patent Application Publication No. 2002-52471).

As described above, when it is intended to move the blast gun, which is disposed inside the blasting chamber from outside thereof, a slit or the like must be formed in the cabinet, and in addition, in order to prevent the dust leaking from this slit, anti-dust measures must be taken. As a result, the number of parts forming the blasting machine is inevitably increased.

Furthermore, even when the anti-dust measures as described above are taken, the slit cannot be completely sealed off, and hence it is difficult to completely prevent the dust from leaking.

In addition, when the blast gun is moved while some abrasive is clogged between the pipe and the rubber curtains provided as the anti-dust measures, a part of the pipe in sliding contact with the rubber curtains is abraded by a cutting force of the abrasive, and as a result, the pipe may be worn out in a shorter period of time in some cases.

Furthermore, according to the moving mechanism for a blast gun having the above structure, the movable region of the blast gun is restricted by the size, shape, and so on of the slit, and in addition, the moving direction of the blast gun is restricted in the longitudinal direction of the slit; hence, complicated movement or arbitrary movement cannot be achieved.

On the other hand, according to the blasting machine in which the moving mechanism for a blast gun, such as the robot, is accommodated in the blasting chamber, the slit through which the pipe is inserted into the cabinet is not necessarily provided, and measures for preventing the dust from leaking outside the cabinet are also not required. Furthermore, the movement is not restricted by the shape or the like of the slit, unlike the case in which a driving mechanism or the like is provided outside the blasting chamber, and it is thus possible to make the blast gun perform a relatively complicated movement.

However, as for the above moving mechanism, such as the robot, disposed in the blasting chamber, when it is accommodated therein without taking any measures, the moving mechanism is directly exposed to the dust in the blasting chamber, and hence failure or the like is liable to occur. Accordingly, it is necessary to take anti-dust measures for the robot or the like.

As the anti-dust measures described above, although the above-described robot or the like accommodated in the blasting chamber is covered by an anti-dust jacket in some cases, depending on the type of abrasive to be used and the process conditions, the jacket may suffer from the problem of being rapidly worn out. In addition, when the anti-dust measures are insufficient, the abrasive or the like may enter the jacket, thereby causing failure. In particular, for example, when the abrasive enters spaces formed between sliding portions, such as a bearing, a shaft, and a motor, a problem may arise in that these parts may become severely worn.

In addition, in blasting, the movement of a blast gun can be performed by a relatively simple motion in many cases, and hence the primary axial movement of the robot may not be required in many cases. Accordingly, when the robot is accommodated in the blasting chamber as described above, the blasting machine may be provided with performance higher than necessary one, and as a result, the cost of the blasting machine is unnecessarily increased.

Accordingly, the present invention has been conceived in order to solve the problems of the above conventional techniques, and an object of the present invention is to provide a moving mechanism for a blast gun for a blasting machine in which, although the structure is relatively simple, the blast gun accommodated in a blasting chamber can be easily moved, and other operations can also be easily performed; anti-dust measures are not required or can be easily provided; and although the structure is relatively simple, it is possible to make the blast gun perform a complicated movement. More particularly, an object of the present invention is to make the blast gun perform a complicated movement by the following means; that is, by operating input means of the present invention, an output arm 30 disposed in a blasting chamber 3 is pivotally moved, that is, arm members (first output arm 31 and second output arm 32) are rotated relative to each other so that the positions of the arms 31 and 32 can be changed.

SUMMARY OF THE INVENTION

In the following explanation of the Summary, reference numerals are referred as of the Embodiment in order to easily read the present invention, however, these numerals are not intended to restrict the invention as of the Embodiment.

In order to achieve the above object, a moving mechanism for a blast gun 10 for a blasting machine according to the present invention comprises: an output arm 30 which is disposed in a blasting chamber 3 formed in a cabinet 4 and which moves a blast gun 5; input means which is disposed outside the blasting chamber 3 and which inputs a movement to be performed by the output arm; and an interlocking unit 40 which is provided to penetrate a wall (top plate in the embodiment) of the cabinet 4 to interlock the input means and the output arm 30, wherein the output arm 30 has two arm members (first and second output arms 31 and 32) which are pivotally attached to each other in such a manner that one member can rotate relative to the other, so that the two output arms 31 and 32 are interlocked to each other;

the interlocking unit 40 has at least two shafts (first and second shafts) 42 and 43 which are extended inside and outside the cabinet 4 and which are configured to be rotatable by the input means;

as for each of the two shafts 42 and 43, the first arm member 31 of the two arm members is interlocked to the first shaft 42, the second arm member 32 which is rotated in conjunction with the second shaft 43 is provided on the arm member 31; and by the rotations of the shafts 42 and 43, the arm members 31 and 32 interlocked to the respective shafts are configured to be rotatable synchronously with the rotations of the respective shafts 42 and 43 (FIGS. 1 to 3, 5, 10, 11, and 13).

In addition, the moving mechanism for a blast gun 10 having the above structure may be formed such that, Two (2) arm members of the output arm 30 are formed of the first output arm 31 and the second output arm 32;

one end 32a of the second output arm 32 is pivotally attached to another end 31b of the first output arm 31, and the blast gun 5 is fitted to the other end 32b of the second output arm 32, the interlocking unit 40 has a casing 41 penetrating the wall of the cabinet 4 and the two shafts formed of the first and the second shafts 42 and 43 disposed in the casing 41, one end (lower end shown in FIG. 4) of each of the first and the second shafts 42 and 43 is disposed in the blasting chamber 3 formed in the cabinet 4, and the other end (top end in the drawing) is extended to a space outside the cabinet 4, and one end 31a of the first output arm 31 is fixed to the one end (lower end in the drawing) of the first shaft 42, and the second shaft 43 is provided to transmits its rotation to the second output arm 32 through a power transmission mechanism including pulleys 62a and 62b, a timing belt 72, and the like so that the second output arm 32 is rotatable around the pivotal attachment position serving as a fulcrum (FIGS. 5, 9, 10, 11, and 13).

In addition, instead of the above structure (FIG. 9), the following structure may be formed, that is, a third shaft 45 is further provided such that one end (lower end in an example shown in the drawing) thereof is disposed in the blasting chamber 3 formed in the cabinet 4, and the other end (top end in the example shown in the drawing) is extended to a space outside the cabinet 4, and an output shaft 54 to which the blast gun 5 is fitted and which is rotatably provided at the other end 32b of the second output arm 32, and a power transmission mechanism which transmits the rotation of the third shaft 45 to the above output shaft 54 are further provided for the output arm 30, the power transmission mechanism including, for example, pulleys 64a to 64d or timing belts 72 and 74, and an output-side relay shaft 56 (FIGS. 10 and 11).

The above input means inputting a rotational driving force to the first and the second shafts 42 and 43 of the interlocking unit 40 is formed of an input arm 20 having two arm members (first input arm 21 and second input arm 22) provided outside the cabinet 4;

one of the two arm members is pivotally attached to the other in such a manner that they can rotate relative to each other, so that the output arm 30 and the input arm 20 are provided, each having a pair of members;

as for the first input arm 21, another end 21b of the first input arm 21 is pivotally attached to one end 22a of the second input arm 22, and one end 21a of the first input arm 21 is fixed to the other end (top end in the example shown in the drawing) of the first shaft 42; and the structure may be formed such that the rotation of a shaft provided at the pivotal attachment position with the first input arm 21 caused by the rotation of the second input arm 22 is transmitted to rotate the second shaft 43 of the interlocking unit 40 through a power transmission mechanism including, for example, pulleys 61a and 61b, a timing belt 71, and so on (FIGS. 5, 10, and 11).

Because of the above structure of the present invention, according to the moving mechanism for a blast gun 10 of the present invention, the output arm 30 disposed inside the blasting chamber 3 is pivotally rotated by operating the input means, such as the input arm 20, disposed outside the blasting chamber 3; that is, one of the two arm members (first output arm 31 and the second output arm 32) is rotated relative to the other so as to change the positions of the arms 31 and 32. Hence, the blast gun 5 fitted to the output arm 30 can be moved to a desired position along a desired trajectory, and although having a relatively simple structure, it is also possible to make the blast gun 5 perform a complicated movement.

Furthermore, since the movement of the output arm 30 is inputted by a rotational driving force, and the interlocking unit 40 itself (casing 41 of the interlocking unit) does not move and remains stationary, when the interlocking unit 40 is provided, it is not necessary to form a large opening as compared to the exterior shape of the interlocking unit 40, in the top plate or the like of the cabinet 4, unlike the slit or the like of the structure disclosed in Japanese Unexamined Patent Application Publication No. 2002-52471.

Hence, the leakage of dust can be prevented without taking any anti-dust measures which are necessary when the above-described slit or the like is provided.

In addition, according to the structure in which the blast gun 5 is fitted to the output arm 30 through the output shaft 54 provided at the other end 32b of the second output arm 32, for example, when the rotation of the output shaft 54 is controlled, the blast gun 5 can always be disposed in a predetermined direction relative to a workpiece surface W, and in addition, when the ejecting direction of the blast gun 5 is set at a predetermined inclined angle with respect to the axial direction of the output shaft 54, by rotating this output shaft 54, the ejecting direction of an abrasive can also be changed.

In the structure in which the input arm 20 is provided as the input means described above, by operating the input arm 20, it is possible to make the output arm 30 perform a movement similar to that of the input arm, and although having a relatively simple structure, the input arm 20 can make the output arm 30 perform a complicated movement; hence, the blast gun 5 can be moved along a complicated trajectory.

In addition, in the case in which rotational driving forces are inputted to the shafts 42, 43, and 45 of the interlocking unit 40, for example, by motors, such as servo motors, when these motors are driven by control signals outputted from an electronic control device or the like, the movement of the output arm 30 (movement trajectory of the blast gun 5) can be precisely repeated by numerical control (NC control) even if the movement is complicated.

In addition, since it is arranged that the power is inputted to the output arm 30 by transmission of a rotational power, without using a complicated power transmission system, the power transmission can be performed by a power transmission mechanism composed of pulleys and a timing belt, a power transmission mechanism composed of a gear mechanism, or other power transmission mechanism having a relatively simple structure; as a result, malfunctions or the like are not likely to occur, and in addition, for example, maintenance can be easily performed.

By the transmission of the rotational power as described above, since the input arm 20 and the output arm 30, each having a pair of members, move in conjunction with each other, when one of the first shaft 42 and the second shaft 43 of the interlocking unit 40 is formed to have a hollow shape, and when the other shaft is received in this hollow shaft, the centers of the axes of the two shafts can be made coincident with each other; as a result, the power transmission can be easily performed, and in addition, the size of the interlocking unit 40 can be reduced.

According to the structure in which an airtight space is provided in the output arm 30, the airtight space accommodating the power transmission mechanism, which includes the pulleys 61a and 61b, 62a and 62b, 63a to 63d, and 64a to 64d, the timing belts 71 to 76, or the like, the structure is not directly exposed to dust and the like in the blasting chamber 3, and as a result, wear caused by abrasion and the occurrence of malfunctions or the like can be significantly reduced.

In addition, according to the structure in which a driving mechanism 80 is provided for moving other end 22b (input portion 23) of the second input arm 22 is provided, this driving device can be flexibly operated in accordance with the intended purpose. For example, this driving device can be arbitrarily operated in accordance with movement instructions inputted via a touch panel, a keyboard, a joystick for remote operation, or the like, or the driving device can be moved in a predetermined pattern in accordance with a predetermined program or the like.

In addition, in the above moving mechanism for a blast gun 10 for a blasting machine according to the present invention comprises the interlocking unit 40 which is provided to penetrate a wall (top plate in the embodiment) of the cabinet 4, however, it is also applied to the interlocking unit 40 of the moving mechanism is disposed in the blasting chamber through upper or lower surface of the cabinet perpendicular to the vertical direction.

BRIEF DESCRIPTION OF DRAWINGS

The objects and advantages of the invention will become apparent from the following detailed description of preferred embodiments thereof provided in connection with the accompanying drawings in which.

DETAILED DESCRIPTION OF THE PREFERRED EMBODIMENT

Figure 1:
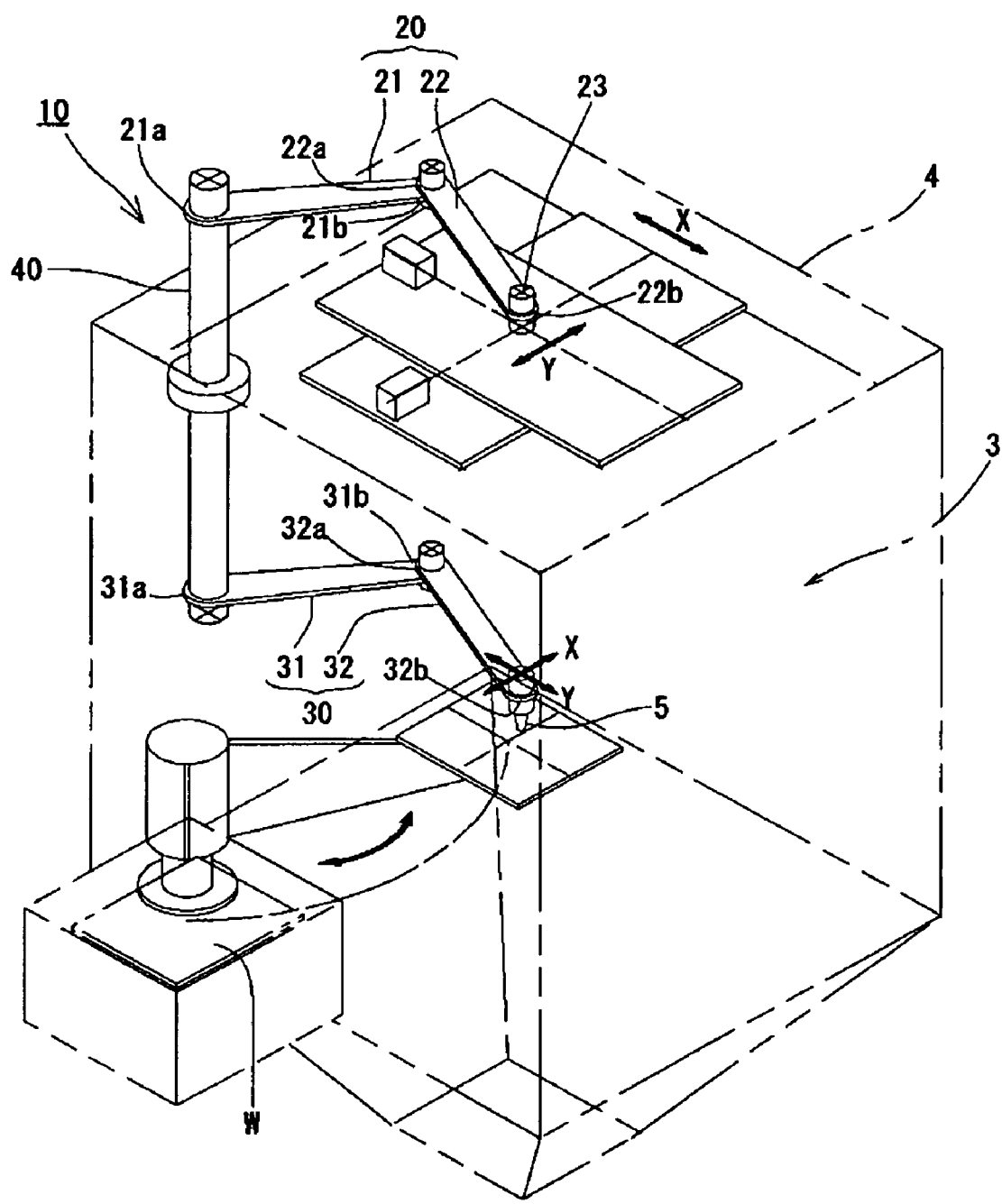
FIG. 1 is a schematic perspective view of a blasting machine including a moving mechanism for a blast gun of the present invention.

Next, embodiments of the present invention will be described below with reference to the attached drawings.

Embodiment 1

Overall Structure

A moving mechanism for a blast gun 10 of the present invention is configured to move, at least two-dimensionally, an output arm 30, which is disposed in a blasting chamber 3 and which is provided with a blast gun 5, by operating input means provided outside the blasting chamber 3. In this embodiment, as shown in FIGS. 1 to 3, the moving mechanism of this blast gun 5 includes the output arm 30, which is disposed in the blasting chamber 3 and which has a front end to which the blast gun 5 is detachably attached; an input arm 20, that is, the above input means, which is disposed outside the blasting chamber 3 and which inputs a motion to be performed by the output arm 30; and an interlocking unit 40, which penetrates a wall (top plate in an example shown in the drawing) and which interlocks the output arm 30 and the input arm 20.

Interlocking Unit

Figure 2:
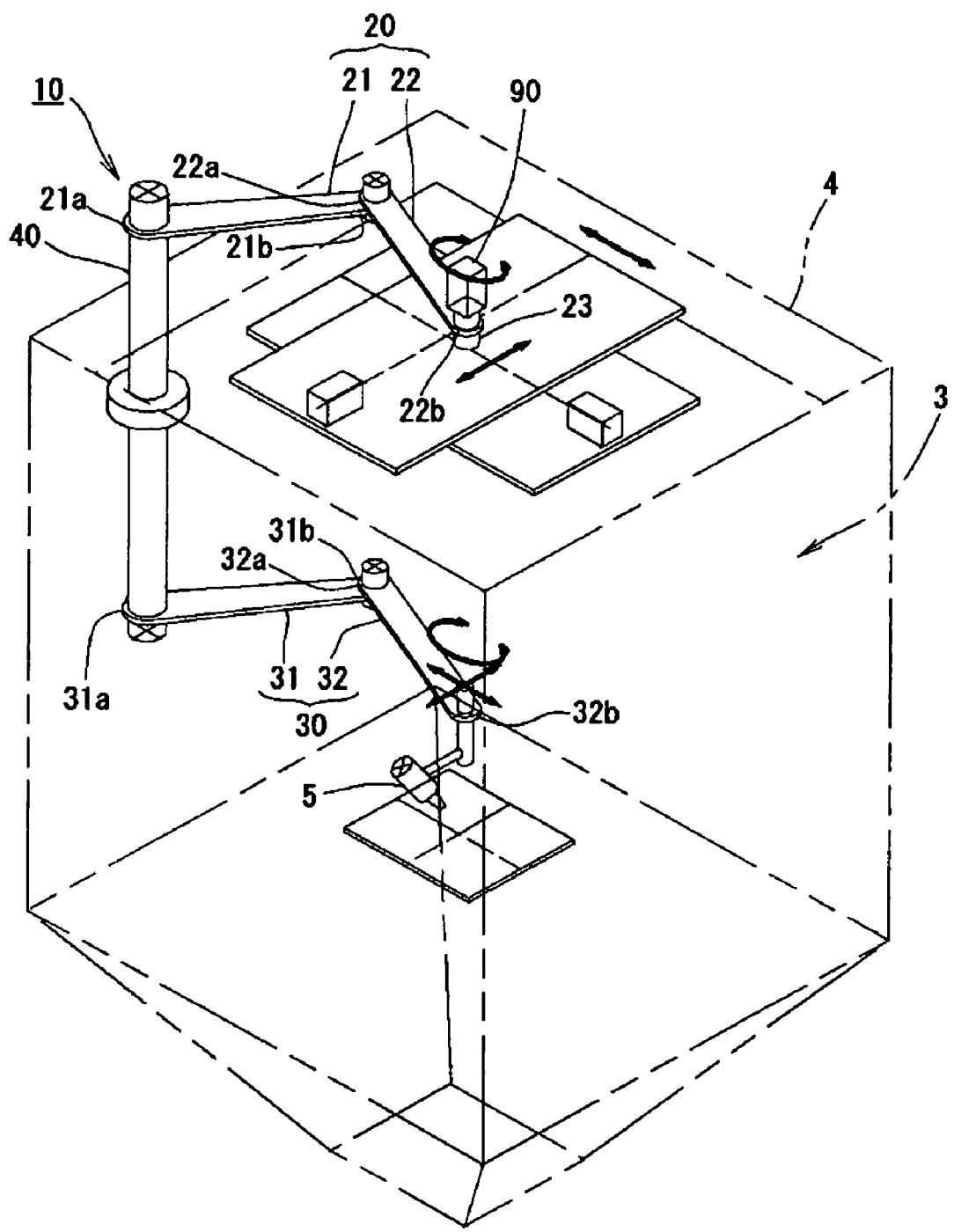
FIG. 2 is a schematic perspective view of a blasting machine including another moving mechanism for a blast gun of the present invention.
Figure 3:
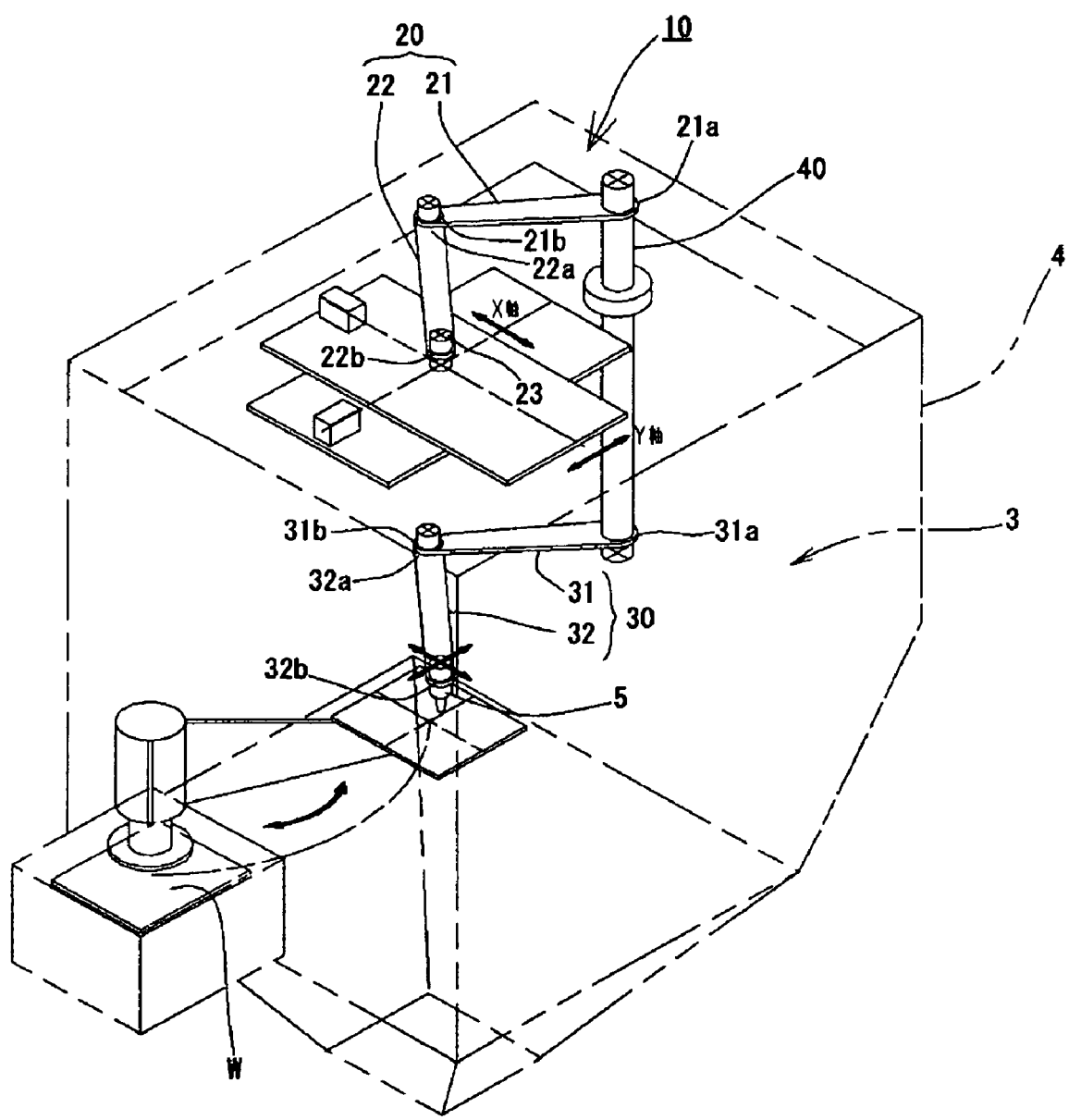
FIG. 3 is a schematic perspective view of a blasting machine including still another moving mechanism for a blast gun of the present invention.

As shown in FIGS. 1 to 3, the interlocking unit 40 described above penetrates the wall of a cabinet 4 of a blasting machine, is disposed inside and outside the blasting chamber 3, is interlocked to the output arm 30 inside the blasting chamber 3, and is interlocked to the input arm 20 outside the blasting chamber 3. In the embodiment shown in FIGS. 1 to 3, the interlocking unit 40 penetrates the top plate of the cabinet 4 and is disposed inside and outside the blasting chamber 3.

Figure 4:
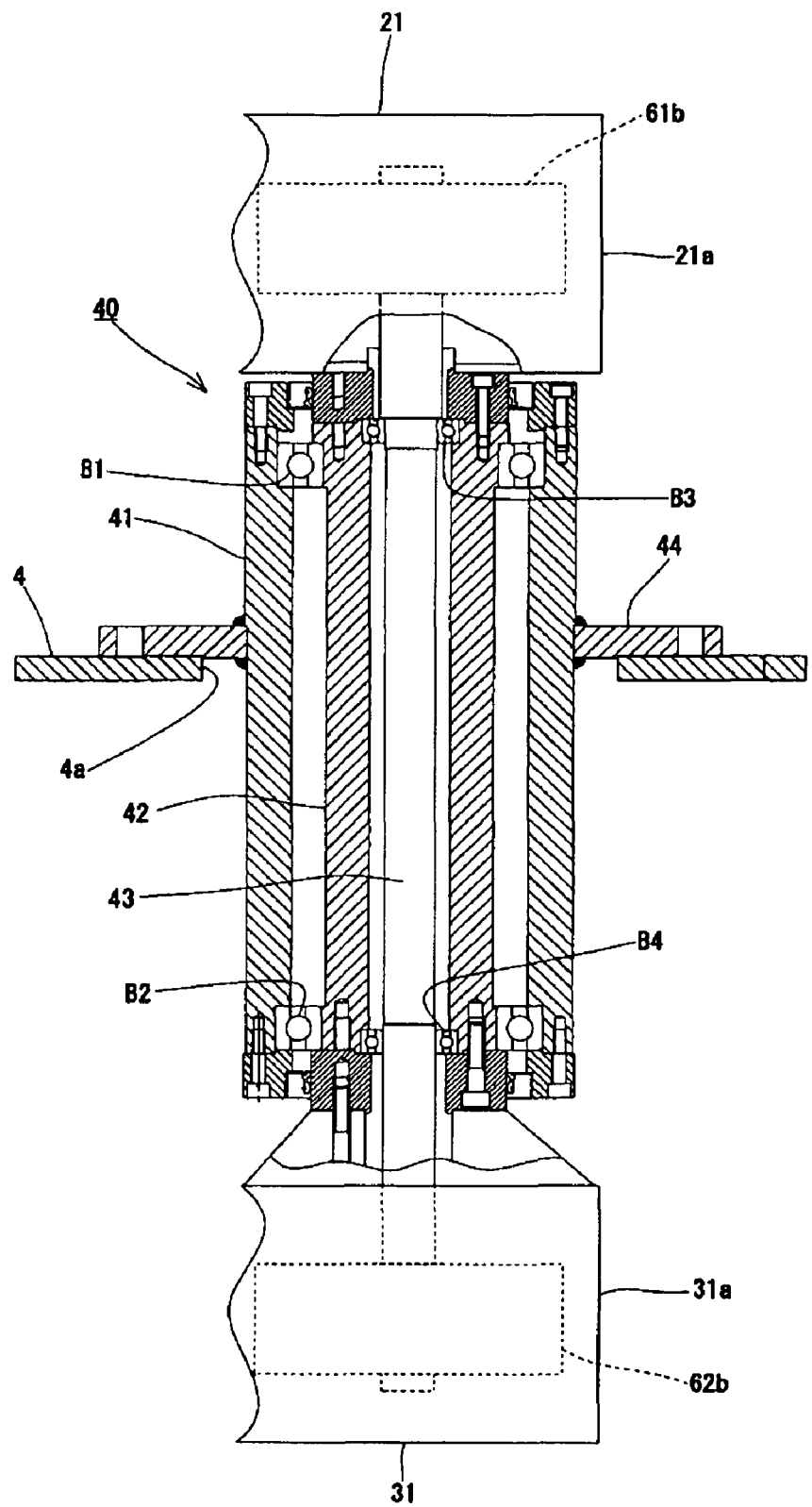
FIG. 4 is a cross-sectional view of an interlocking unit.

As shown in FIG. 4, this interlocking unit 40 has a structure in which an interlocking member for interlocking the input arm 20 and the output arm 30, each having a pair of members, is accommodated in a casing 41. In the embodiment shown in FIG. 4, as the interlocking member, two shafts, that is, a first and a second shaft (42 and 43), are provided, the hollow first shaft 42 being rotatably received in the cylindrical casing 41, and the second shaft 43 being received in the first shaft 42 so as to be rotatable independently of the first shaft 42.

In this embodiment, bearings B1 to B4 are respectively provided between the inner circumference of the casing 41 and the outer circumference of the first shaft 42 and between the inner circumference of the first shaft 42 and the outer circumference of the second shaft 43 so that the first shaft 42 and the second shaft 43 are independently and smoothly rotatable.

A flange 44 is fixed to the casing 41 of this interlocking unit 40, as shown in FIG. 4, by welding or by other method; this interlocking unit 40 is inserted in an opening 4a formed in the top plate of the cabinet 4 of the blasting machine; and in addition, the space formed between the opening 4a formed in the top plate of the cabinet 4 and the casing 41 of the interlocking unit 40 is sealed off by this flange 44 to maintain airtightness in the blasting chamber 3, so that dust in the blasting chamber is prevented from leaking through the opening 4a formed in the top plate of the cabinet 4.

In the illustrated embodiment, the above flange 44 is fixed to the outer circumference of the casing 41 by welding; however, instead of the structure described above, any structure may be adopted as long as dust generated in the blasting chamber 3 can be prevented from leaking through the opening 4a formed in the top plate of the cabinet 4. For example, the casing 41 and the flange 44 may be integrally formed; without providing the flange 44 around the casing 41, the space formed between the opening 4a formed in the top plate of the cabinet 4 and the casing 41 of the interlocking unit 40 may be sealed off, for example, by directly welding the edge of the opening in the top plate and the casing 41 of the interlocking unit 40 inserted in the opening 4a formed in the top plate of the cabinet 4; or a rubber seal or the like may be provided between the flange 44 and the top plate of the cabinet 4 to enhance the airtightness.

Input Arm (Input Means)

The above input arm 20 interlocked to the interlocking unit 40 outside the blasting chamber 3 is formed by interlocking a plurality of arm members; in the illustrated embodiment, the input arm 20 is formed of a first input arm 21 interlocked to the interlocking unit 40 at one end 21a and a second input arm 22 interlocked to the other end 21b of the first input arm 21. Since one end 22a of the second input arm 22 is pivotally supported at the other end 21b of the first input arm 21, the input arm 20 is formed so as to be bendable in a V-shape around this pivotal support position as a whole.

The one end 21a of the first input arm 21 forming this input arm 20 is fixed to the top end of the first shaft 42 of the above interlocking unit 40, which penetrates the top plate of the cabinet 4 and protrudes upward, by a method such as bolting (FIG. 4), and when the first input arm 21 is rotated, the first shaft 42 of the interlocking unit 40 is configured to be rotated in the casing 41 in accordance with the rotation angle of this first input arm 21.

In addition, a power transmission mechanism is provided between the second input arm 22 and the second shaft 43 of the interlocking unit 40, and when the second input arm 22 is rotated with respect to the first input arm 21 around the pivotal support position, the second shaft 43 is configured to be rotated in accordance with the rotation angle of the second input arm 22.

Figure 5:
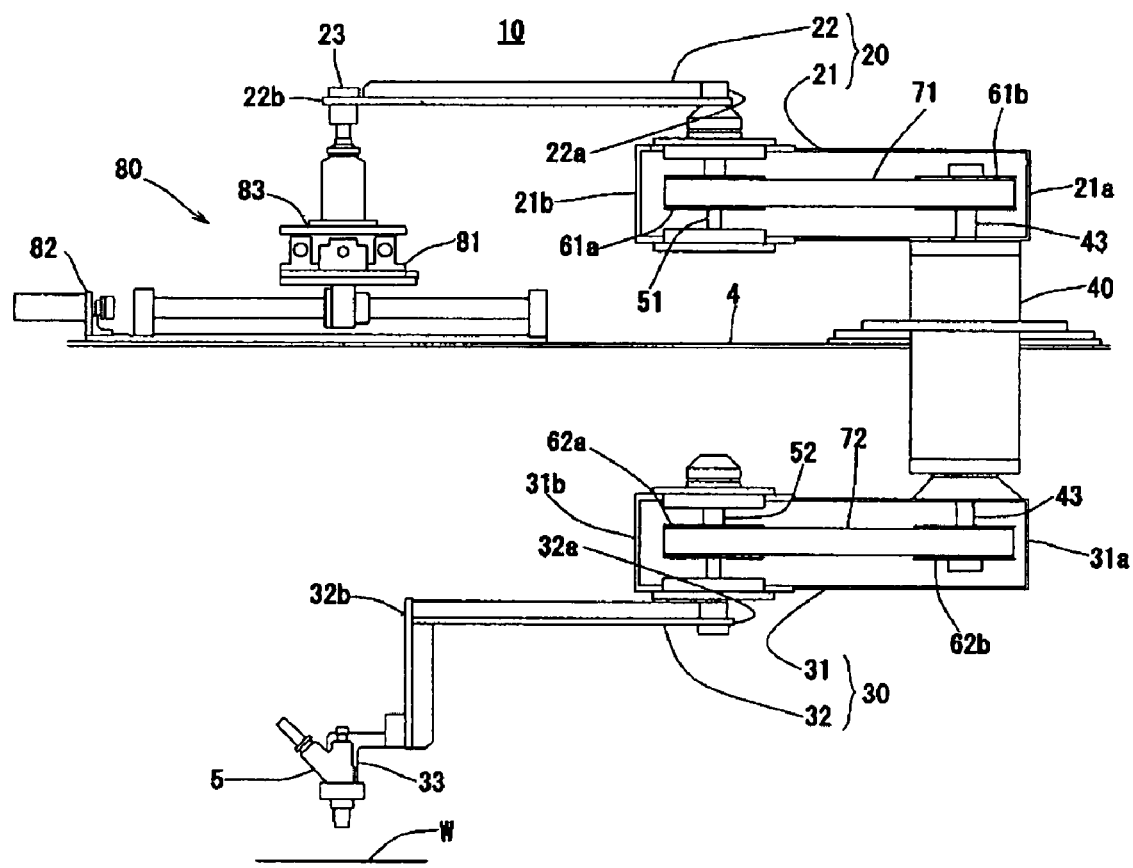
FIG. 5 is a perspective view of a principal portion of a moving mechanism for a blast gun of the present invention.
Figure 6:
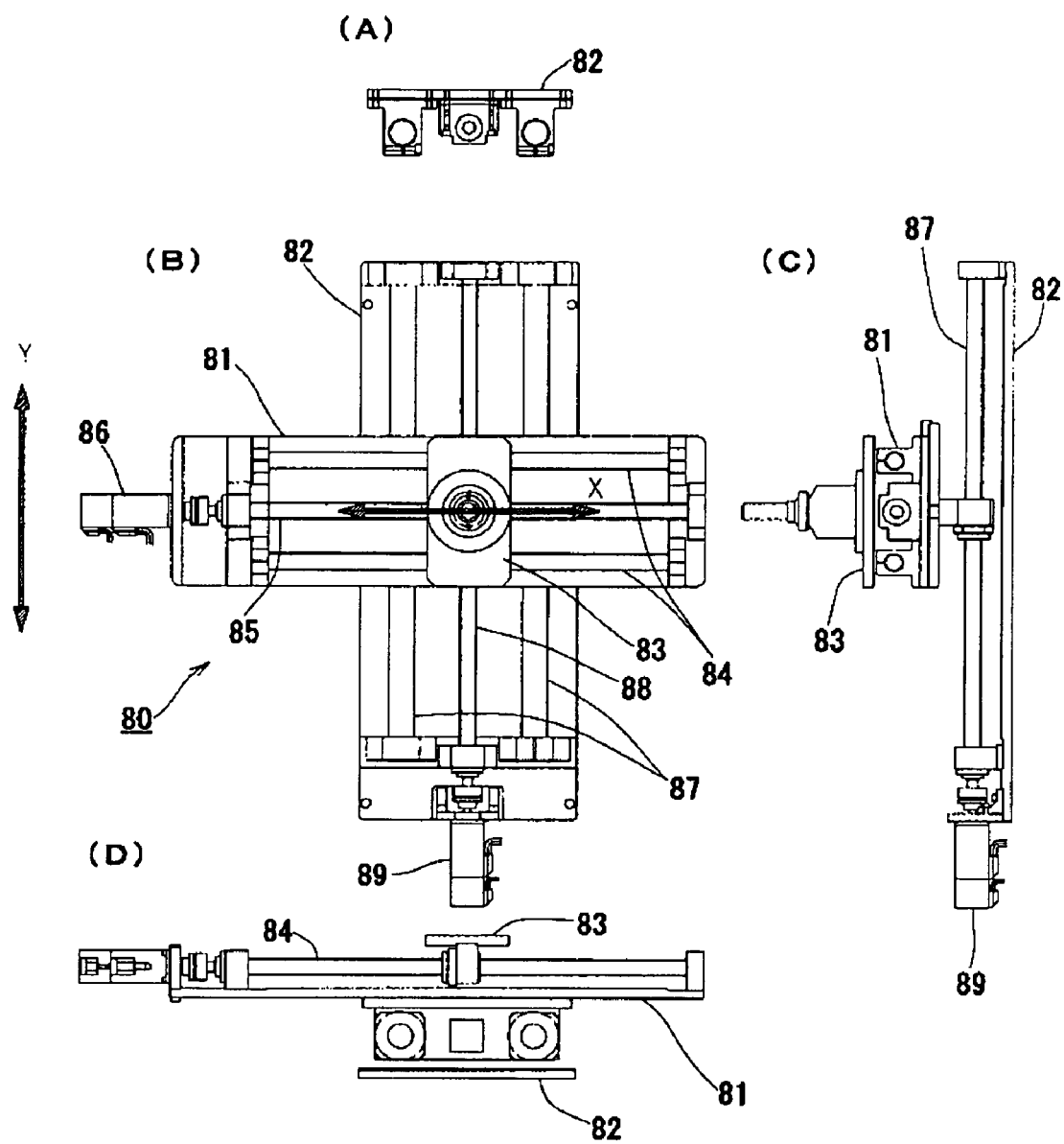
FIG. 6 includes views of a driving mechanism: (A) is a rear view of a Y-axis direction sliding table portion forming the driving mechanism; (B) is a plan view of the driving mechanism; (C) is a right side view of the driving mechanism; and (D) is a front view of the driving mechanism.

In an embodiment shown in FIG. 5, a structure is formed such that a spindle 51 which pivotally supports the second input arm 22 rotatably with respect to the first input arm 21 is fixed to the second input arm 22 so that the spindle 51 is rotated together with the rotation of the second input arm 22; a pulley 61a to be rotated together with this spindle 51 is fixed to the spindle 51; and when a common timing belt 71 is wrapped around this pulley 61a and a pulley 61b, which is fixed to the top end of the second shaft 43, and the second input arm 22 is rotated, the second shaft 43 of the interlocking unit 40 is rotated by an angle corresponding to this rotation angle.

However, the structure of the power transmission mechanism is not limited to that formed of the pulleys 61a and 61b and the timing belt 71, as shown in FIG. 5; for example, the second shaft 43 of the interlocking unit 40 may be configured to be rotated in accordance with the rotation of the second input arm 22 by means of a gear mechanism. That is, any mechanism may be adopted as long as it can enable the second shaft 43 of the interlocking unit 40 to rotate in accordance with the rotation angle of the second input arm 22.

According to the input arm 20 thus configured, an input portion 23 for inputting motion to be performed by the blast gun 5 is provided at a free end 22b of the second input arm 22, and when this input portion 23 is moved in accordance with the motion to be performed by the blast gun 5, the front end of the output arm 30 described below (a free end 32b of a second output arm 32) is moved along the trajectory in which this input arm 23 is moved so as to make the blast gun 5 perform a desired operation.

Output Arm

The output arm 30 interlocked to the above interlocking unit 40 inside the blasting chamber 3 is also formed by interlocking a plurality of arm members, as with the above input arm 20; in this embodiment, the output arm 30 is formed by interlocking two arms (first output arm 31 and second output arm 32).

In addition, one end 31a of the first output arm 31, which is one of the above arms, is fixed to the first shaft 42 of the interlocking unit 40 by bolting or the like (FIG. 4) so that when the above first shaft 42 is rotated, the first output arm 31 is configured to be rotated by a rotation angle corresponding to the rotation angle of this first shaft 42, and the one end 32a of the second output arm 32 is pivotally supported at the other end 31b of the first output arm 31 by a spindle 52.

In addition, between the second shaft 43 of the interlocking unit 40 and the second output arm 32, a power transmission mechanism is provided which rotates the second output arm 32 around a pivotal support position (spindle 52) of the first output arm 31 together with the rotation of the second shaft 43; in the embodiment shown in FIG. 5, as the power transmission mechanism described above, the spindle 52 is fixed to the second output arm 32 so that the second output arm 32 is rotated together with the rotation of the spindle 52; a pulley 62a is fixed to the spindle 52 so that the spindle 52 is rotatable by the rotation of the pulley 62a; and a common timing belt 72 is wrapped around this pulley 62a fixed to this spindle 52 and a pulley 62b fixed to the lower end of the second shaft 43 of the interlocking unit 40.

In addition, an attachment portion 33 for the blast gun 5 is provided at the free end 32b of the second output arm 32, and the blast gun 5 is fitted to this attachment portion 33.

In the illustrated embodiment, a structural example is shown in which the power transmission mechanism transmitting the rotation of the second shaft 43 to the second output arm 32 is formed of the pulleys 62a and 62b and the timing belt 72; however, instead of this structure, for example, this power transmission mechanism may be formed of a gear mechanism or the like, as in the case of the above input arm 20, and any type of existing power transmission mechanisms may be adopted as long as the second output arm 32 is rotatable together with the rotation of the second shaft 43.

In addition, for the anti-dust measures, the power transmission mechanism described above may be accommodated in an airtight space formed in the first input arm 21 or the first output arm 31, as shown in FIG. 5, and for the output arm 30 disposed in the blasting chamber 3, which is particularly exposed to dust, the anti-dust measures as described above are preferably taken.

In addition, in the embodiment described with reference to FIG. 5, it is described that the pulleys 61b and 62b are fixed to the second shaft 43 of the interlocking unit 40, and that the first input arm 21 and the first output arm 31 are fixed to the first shaft 42; conversely, however, the first input arm 21 and the first output arm 31 may be fixed to the second shaft 43, and the pulleys 61b and 62b may be fixed to the first shaft 42.

In the moving mechanism for a blast gun 10 thus formed, when the blast gun 5 is fitted to the free end 32b of the above second output arm 32, and when the input portion 23 provided at the free end 22b of the second input arm 22 is moved in a direction in which the blast gun 5 is to be moved, for example, in the X-Y direction shown in FIG. 1, together with this movement, the second input arm 22 is bent at a predetermined angle with respect to the first input arm 21, and the first input arm 21 is pivotably rotated around the first shaft 42 of the interlocking unit 40.

By the rotation of this first input arm 21, the first shaft 42 fixed to one end of the first input arm 21 is rotated by an angle corresponding to the rotation angle of the first input arm 21, and the first output arm 31 fixed to the lower end of the first shaft 42 is rotated by an angle corresponding to the rotation angle of the first shaft 42.

In addition, the spindle 51 and the pulley 61a are rotated by the rotation of the second input arm 22, and the rotation of the pulley 61a is transmitted to the pulley 61b through the timing belt 71 so that the second shaft 43 of the interlocking unit 40 is rotated. In addition, the rotation of this second shaft 43 is transmitted to the spindle 52 through the pulleys 62b and 62a and the timing belt 72, and the second output arm 32 fixed to this spindle 52 is rotated.

Accordingly, by making the individual arm lengths of the input arm 20 and the output arm 30 the same and by transmitting power with the power transmission mechanism without acceleration or deceleration, for example, by making the diameters of the pulleys 61a and 61b and 62a and 62b constant, the output arm 30 synchronously rotates together with the rotation of the two arm members (first input arm 21 and second input arm 22) generated in the input arm 20; therefore, at the blast gun 5 fitted to the free end 32b of the second output arm 32, it is possible to perform the same movement as the movement of the input portion 23 provided at the free end 22b of the second input arm 22.

In the illustrated embodiment, a structural example is shown in which the input portion 23 provided for the input arm 20 and the blast gun 5 fitted to the output arm 30 are moved in a similar manner; however, the operation mode is not limited to the illustrated embodiment. For example, a structure may be formed such that, by changing the length of each arm of the input arm 20 and the length of each arm of the output arm 30 in a predetermined proportion, the blast gun 5 may be moved in accordance with a magnified or reduced movement (movement trajectory) similar to the movement (movement trajectory of the input portion 23) inputted in the input portion 23 of the input arm 20, or by changing the diameters of the above pulleys in a predetermined proportion, the movement inputted by the input arm 20 may be performed by the output arm 30 in a magnified or reduced manner.

In addition, in the illustrated embodiment, the movement of the blast gun 5 is described, for example, as a planar movement only in the two X-Y directions shown in FIG. 1; however, the blast gun 5 may be formed so as to be moved in a three dimensional way. For example, when the entire interlocking unit 40 described above, or the first shaft 42 and the second shaft 43 received in the interlocking unit 40, is configured to be movable up and down with respect to the top plate of the cabinet 4, the blast gun 5 may be movable in a direction so as to approach or retreat from the workpiece surface.

Embodiment 2

Driving Mechanism

In the moving mechanism for a blast gun 10 formed as described above, the input portion 23 provided for the above input arm 20 may be operated manually by providing a handle or the like at the input portion 23 and gripping it. However, for example, this input portion 23 may be operated by a driving mechanism 80 operating the input portion 23 in accordance with a received electrical signal or the like.

By providing the driving mechanism 80 as described above, for example, the operation of the input portion 23, that is, the movement of the blast gun 5, can be performed in a desired pattern in accordance with a predetermined program, and in addition, if necessary, the blast gun 5 may be operated in accordance with the operation of a keyboard, a touch panel, a joystick for remote control operation, or the like.

One example of the above-mentioned driving mechanism 80 will be described with reference to FIGS. 6(A) to 6(D).

The driving mechanism 80 shown in FIGS. 6(A) to 6(D) is interlocked to the input portion 23 provided at the free end 22b of the above second input arm 22 so as to make this input portion 23 move in the XY axial directions in the drawing, and has an X-axis direction slide table 81 moving the input portion 23 provided for the second input arm 22 in the X axis direction shown in the drawing and a Y-axis direction slide table 82 moving the input portion 23 in the Y axis direction in the drawing. In the illustrated embodiment, the input portion 23 provided for the second input arm 22 is movably fitted to the X-axis direction slide table 81, and the above X-axis direction slide table 81 is placed on the Y-axis direction slide table 82 to be movable in the Y-axis direction, so that the input portion 23 can be moved in the Y axis direction together with the X-axis direction slide table 81.

In addition, the arrangement of the X-axis direction slide table 81 and the Y-axis direction slide table 82 is not limited to the illustrated embodiment. For example, in an opposite manner to that shown in the drawing, the Y-axis direction slide table 82 may be provided on the X-axis direction slide table 81, and the input portion 23 provided for the above second input arm 22 may be provided on this Y-axis direction slide table 82 so as to be movable in the X-Y direction.

A slider 83 moving in the longitudinal direction (X axis direction) of the above X-axis direction slide table 81 is provided on the X-axis direction slide table 81 on which the input portion 23 provided for the above second input arm 22 is provided, and by interlocking this slider 83 and the input portion 23 provided for the second input arm 22, the input portion 23 is movable together with the movement of the slider 83.

This slider 83 of this embodiment has two apertures formed in the bottom surface along the longitudinal direction of the X-axis direction slide table 81, which is an axial direction, and a spiral aperture formed between the two apertures. When guide shafts 84 provided on the above X-axis direction slide table 81 along the longitudinal direction thereof are inserted in the apertures provided in the bottom surface of the slider 83, and when a spiral shaft 85 having a spiral shape around the outer circumference is screwed into the above spiral aperture and is rotated normally or reversely, the slider 83 can be made movable back and forth on the X-axis direction slide table 81 in the longitudinal direction (X axis direction) thereof.

At one end of this screw shaft 85, for example, a rotation driving means 86 such as a motor, preferably a servo motor capable of controlling a rotation angle, is interlocked, and by controlling an electrical signal or the like inputted to this rotation driving means 86, the slider 83 can be moved to a predetermined position on the X-axis direction slide table 81.

In addition, as in the bottom surface of the slider 83 provided on the X-axis direction slide table 81, in the bottom surface of the above X-axis direction slide table 81 which is moved on the above Y-axis direction slide table 82, two apertures are formed along the moving direction, which is the axial direction, and a spiral aperture is formed between the two apertures. When guide shafts 87 provided on the Y-axis direction slide table 82 along the longitudinal direction thereof are inserted in the apertures provided in the bottom surface of the X-axis direction slide table 81, and when a spiral shaft 88 is screwed into the above spiral aperture and is rotated by a rotation driving means 89, such as a servo motor, provided at one end of this screw shaft 88, the X-axis direction slide table 81 is designed to be movable in the Y axis direction.

Figure 7:
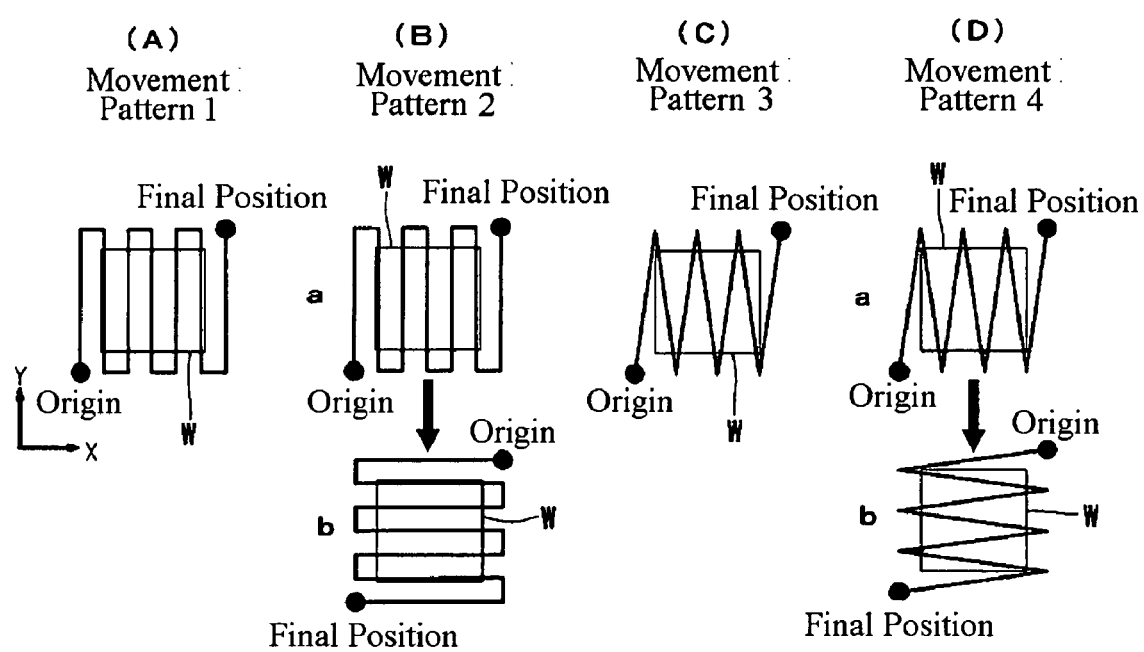
FIG. 7 includes schematic views showing control pattern examples of a blast gun: (A) is a single pattern having a rectangular waveform; (B) is a composite pattern having a rectangular waveform; (C) is a sawtooth single pattern; and (D) is a sawtooth composite pattern.

As a result, in accordance with commands inputted by the input means, such as a keyboard, a touch panel, or a joystick, or in accordance with a program or the like setup beforehand, corresponding electrical signals are inputted to the rotation driving means 86, such as the above servo motor, attached to the X-axis direction slide table 81 and to the rotation driving means 89, such as the above servo motor, attached to the Y-axis direction slide table 82 so as to move the input portion 23 attached to the input arm 20; as a result, the blast gun 5 fitted to the output arm 30 can be moved, for example, in accordance with various patterns shown in FIGS. 7(A) to (B), or in arbitrary directions.

Figure 8:
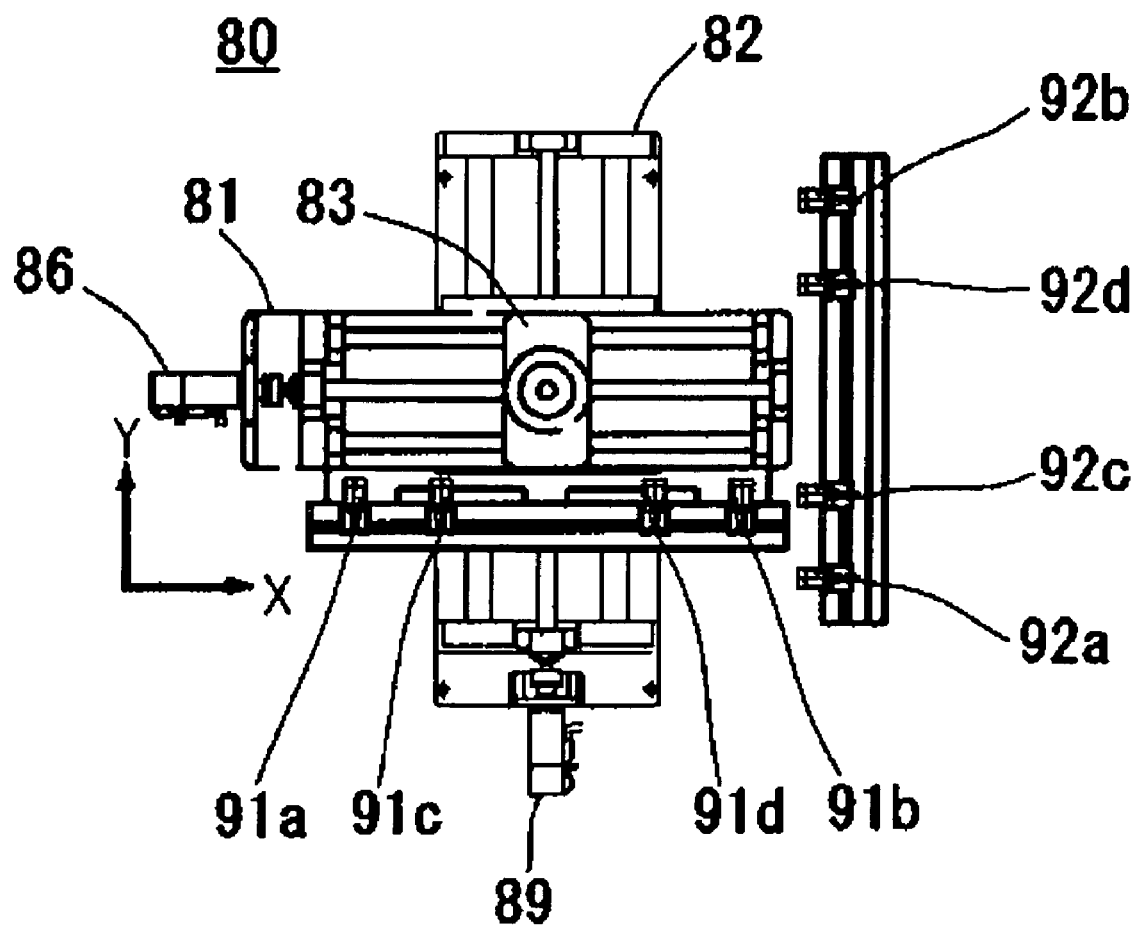
FIG. 8 is a view showing the arrangement of a sensor of the driving mechanism.

FIG. 8 shows a structural example in which sensors 91a to 91d and 92a to 92d are provided for the above driving mechanism 80 which moves the input portion 23 provided for the input arm 20 as described above, and the position of the input portion 23 (slider 83 and the X-axis direction slide table 81) is detected by the sensors 91a to 91d and 92a to 92d so that a desired movement is performed.

In the illustrated embodiment, among the sensors 91a to 91d provided in the X axis direction, the sensors 91a and 91b provided at the two ends in the X axis direction are overrun sensors detecting the movement limit of the slider in the X axis direction, the sensor located on the left side in the drawing is the sensor 91a for detecting an overrun to forward direction, and the sensor located on the right side in the drawing is the sensor 91b for detecting an overrun to backward direction.

Two sensors 91c and 91d provided between the two overrun sensors 91a and 91b are movement end sensors detecting the movement end of the slider 83 in the X axis direction corresponding to the movement end of the blast gun 5 in the X axis direction, which is determined by the size or the like of a workpiece surface W; the sensor located on the left side in the drawing is the sensor 91c for detecting an end of movement to backward direction; and the sensor located on the right side in the drawing is the sensor 91d for detecting an end of movement to forward direction.

In addition, among the sensors 92a to 92d provided in the Y axis direction, the sensors 92a and 92b provided at the two ends in the Y axis direction are overrun sensors detecting the movement limit of the X-axis direction slide table 81 in the Y axis direction, the sensor located at the bottom in the drawing is the sensor 92a for detecting an overrun to forward direction, and the sensor located at the top in the drawing is the sensor 92b for detecting an overrun to backward direction.

Two sensors 92c and 92d provided between the two overrun sensors 92a and 92b are movement end sensors detecting the movement end of the X-axis direction slide table 81 in the Y axis direction corresponding to the movement end of the blast gun 5 in the Y axis direction, which is determined by the size or the like of the workpiece surface W; the sensor located at the bottom in the drawing is the sensor 92c for detecting an end of movement to backward direction; and the sensor located at the top in the drawing is the sensor 92d for detecting an end of movement to forward direction.

By way of example, a case will be described in which, by moving the input portion 23 provided for the input arm 20 using the driving mechanism 80 provided with the above sensors 91a to 91d and 92a to 92d, motion control of the blast gun 5 is performed on the workpiece surface W in accordance with a movement pattern 1 shown in FIG. 7(A). When the movement starts, first, the slider 83 is moved to the position at which the sensor 91c for detecting an end of movement to backward direction among the sensors 91a to 91d provided in the X axis direction detects the slider 83, and the X-axis direction slide table 81 is moved to the position at which the sensor 92c for detecting an end of movement to backward direction among the sensors 92a to 92d provided in the Y axis direction detects the X-axis direction slide table 81, so that this position is set as the origin.

The rotation driving means (motor) 89 provided for the Y-axis direction slide table 82 is rotated at a constant velocity, so that the X-axis direction slide table 81 is gradually moved in the Y axis direction (the top in the drawing) from this origin. In this step, the motor 86 provided for the X-axis direction slide table 81 is stopped.

As described above, when the X-axis direction slide table 81 is moved in the Y axis direction, and the sensor 92d for detecting an end of movement to forward direction detects a portion to be detected of the X-axis direction slide table 81, the rotation of the motor 89 provided for the Y-axis direction slide table 82 is stopped by a detection signal of this sensor 92d for detecting an end of movement to forward direction, and the rotation driving means (motor) 86 provided for the X-axis direction slide table 81 is rotated by a predetermined rotation angle, so that the slider 83 is moved in the X axis direction by a predetermined distance.

After the motor 86 provided for the X-axis direction slide table 81 is rotated by a predetermined rotation angle, the motor 89 provided for the Y-axis direction slide table 82 starts rotating in reverse, so that the X-axis direction slide table 81 starts moving backward.

By this backward movement, when the sensor 92c for detecting an end of movement to backward direction among the sensors provided in the Y axis direction outputs a detection signal indicating detection of the portion to be detected of the X-axis direction slide table 81, the rotation of the motor 89 provided for the Y-axis direction slide table 82 is stopped by this detection signal, and the motor provided for the X-axis direction slide table 81 is rotated by a predetermined angle, so that the slider is moved in the X axis direction by a predetermined distance.

In addition, after the movement described above is repeated, when the sensor 91d for detecting an end of movement to forward direction of the sensors provided in the X axis direction detects a portion to be detected of the slider, and when the sensor 92d for detecting an end of movement to forward direction of the sensors provided in the Y axis direction outputs a detection signal indicating detection of the portion to be detected of the X-axis direction slide table 81, this position is set as the final position, and the movement of the slider 83 and that of the X-axis direction slide table 81 are completed.

Subsequently, the slider 83 and the X-axis direction slide table 81 are returned to the origin, and the above operations are repeatedly performed.

When a blasting machine having the moving mechanism for a blast gun of the present invention has a structure in which the workpiece surface W is disposed at a predetermined position in the blasting chamber 3, as shown in FIGS. 1 and 3, it may be configured such that, in response to detection signals generated when the sensors 91d and 92d for detecting an end of movement to forward direction detect that the slider 83 and the X-axis direction slide table 81 reach the final position of the movement, the processed workpiece surface W disposed in the blasting chamber 3 is removed, and an untreated new workpiece surface W is disposed at a predetermined position in the blasting chamber 3.

In addition, even if the slider 83 and the X-axis direction slide table 81 are not reached to the above final position, when any of the overrun sensors 91a, 91b, 92a, and 92b provided in the X axis direction and the Y axis direction detects overrun of the slider 83 or the X-axis direction slide table 81, the above driving mechanism 80 may be configured to be immediately stopped.

With the drive control using the driving mechanism 80, as described above, when the input portion 23 provided for the input arm 20 is moved along a movement trajectory having a rectangular waveform, in a manner similar to that described above, the blast gun 5 fitted to the output arm 30 can be moved along a movement trajectory having a rectangular waveform, as shown in FIG. 7(A), with respect to the workpiece surface W, and when an abrasive is ejected from the blast gun 5 during this movement, the workpiece surface can be processed in a predetermined pattern.

When the workpiece surface W is processed in a movement pattern 2 shown in FIG. 7(B), after the driving mechanism 80 is moved in accordance with the above movement pattern 1, the driving mechanism 80 may be further moved in accordance with a pattern b shown in FIG. 7(B), in which the final position of the movement pattern 1 is regarded as the origin.

In addition, when the driving mechanism is driven in accordance with a movement pattern 3 shown in FIG. 7(C), the motor 86 provided for the X-axis direction slide table 81 may be continuously rotated at a constant velocity while the motor 89 provided for the Y-axis direction slide table 82 is driven, and as a result, the blast gun 5 can be moved along a sawtooth pattern. Furthermore, when movement is performed in accordance with a movement pattern 4 shown in FIG. 7(D), after the movement in accordance with the movement pattern 3 shown in FIG. 7(C), the movement may be performed in accordance with a pattern b shown in FIG. 7(D), in which the final position of the movement pattern 3 is regarded as the origin.

In addition, in the embodiment described above, in the described structure of the driving mechanism 80, the input portion of the input arm 20 is movable in any X-Y directions; however, the blast gun 5 may be configured so as to be linearly moved only in one direction along the X axis or the Y axis. In this case, only one of the X-axis direction slide table 81 and the Y-axis direction slide table 82 need be provided, and hence the structure of the driving mechanism 80 is not limited to the embodiment shown in the drawing.

Embodiment 3

In the above embodiment described with reference to FIG. 5, the structure is such that the output arm 30 is moved in conjunction with the movement of the input arm 20; however, in the moving mechanism for a blast gun of this embodiment described with reference to FIG. 9, in addition to the movement of the moving mechanism described in FIG. 5, the following structure is further provided. Specifically, an output shaft 54 to which the blast gun 5 is fitted is further rotatably provided in the output arm 30 (second output arm 32) so that a rotation angle, which corresponds to the inclination of the second input arm 22 with respect to the X and the Y axes which are the moving directions of the input portion, can be inputted to the above output shaft 54. As a result, the blast gun 5 can always be directed in a predetermined direction with respect to the workpiece surface (for example, in the structure shown in FIG. 9, the line of the blast guns 5 is always parallel to the above Y axis).

In order to realize the rotation of the output shaft 54 as described above, in the embodiment shown in FIG. 9, in addition to the structure described with reference to FIG. 5, a spindle 52' fixed to the second output arm 32 is formed to be hollow, and a relay shaft 56 penetrating this spindle 52' and rotating inside the spindle 52 is provided. Furthermore, a power transmission mechanism which increases the rotation of the second shaft by a factor of two and transmits it to this relay shaft 56 and a power transmission mechanism which reverses the rotation of the relay shaft 56 and transmits it to the output shaft 54 are also provided.

In the embodiment shown in the drawing, two pulleys 62b and 62b' are fixed to the second shaft 43 in the blasting chamber 3, the pulley 62b is interlocked to the pulley 62a fitted to the spindle 52, which is fixed to the second output arm 32, using the timing belt 72 provided therebetween, as described with reference to FIG. 5, and the other pulley 62b' is interlocked to a pulley 62a' having half the circumference of that of the pulley 62b' using a timing belt 72' provided therebetween, thus forming a structure in which the rotation of the second shaft is increased by a factor of two and is then transmitted to the relay shaft 56.

In addition, at the second output arm 32, a pinion gear 57 is fixed to the above relay shaft 56, a spindle 59 provided with a pinion gear 58 to be engaged with this pinion gear 57 is provided, and a pulley 64b provided around the spindle 59 and a pulley 64a provided around the output shaft 54 are formed to have the same diameter. Furthermore, a common timing belt 74 is wrapped around the above pulleys, so that the rotation of the relay shaft 56 is reversely transmitted to the output shaft 54.

Figure 9:
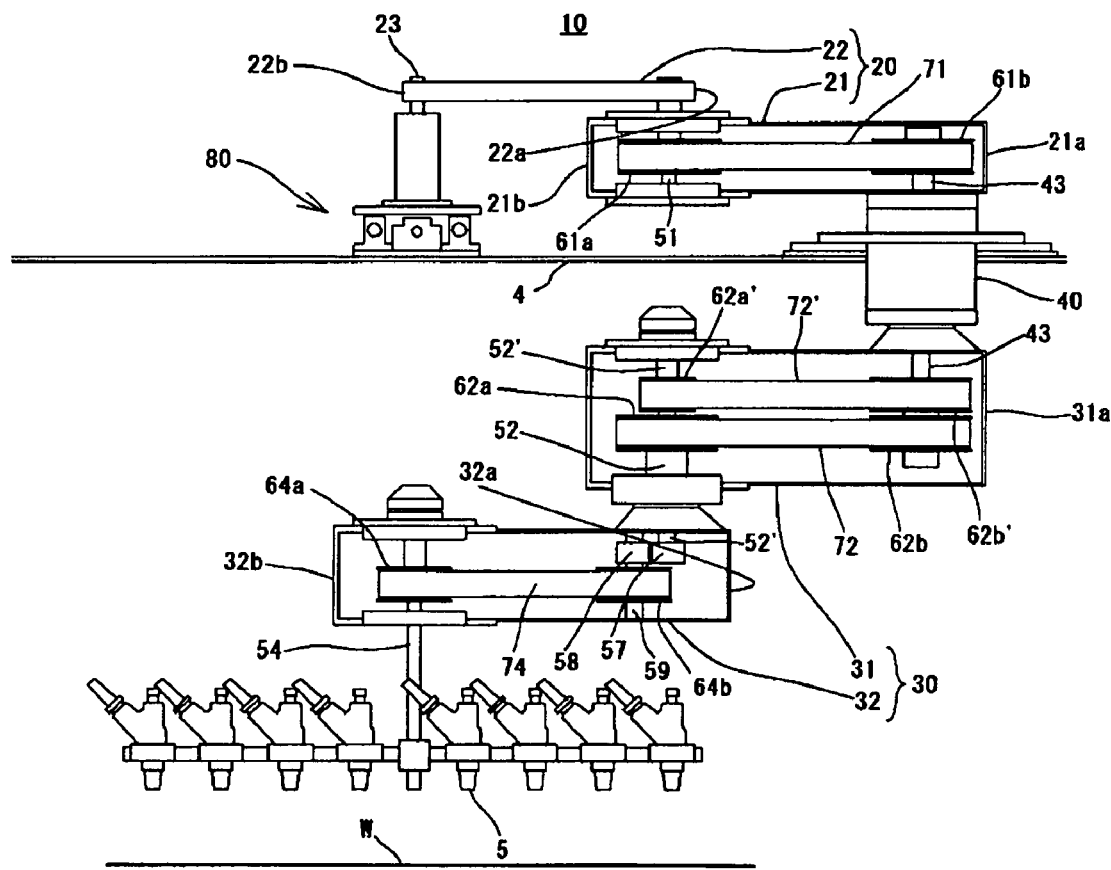
FIG. 9 is a perspective view of a principal portion of a moving mechanism for a blast gun of the present invention.

That is, in the structure shown in FIG. 9, when it is intended to always move the line of the blast guns 5 parallel to the Y axis, for an angle change θ between the first output arm 31 and the second output arm 32, the output shaft 54 is rotated by −θ.

Accordingly, by engagement between the above pinion gears 57 and 58, when the rotation of the second shaft 43 is reversely transmitted to the output shaft 54, the output shaft 54 is configured to be reversed with respect to the angle change θ between the first output arm 31 and the second output arm 32.

In addition, in the structure shown in FIG. 9, when the second output arm 32 is rotated by the spindle 52, together with this rotation, the pinion gear 58, which is one of the pinion gears 57 and 58 reversing the rotation of the second shaft 43, revolves around the circumference of the pinion gear 57; hence, when the rotation velocity of the pinion gear 57 is the same as that of the spindle 52, the pinion gear 58 does not rotate, and as a result, the output shaft 54 cannot be rotated.

Hence, since the circumference of the pulley 62a' provided around the relay shaft 56 is one half of that of the pulley 62b' provided around the second shaft 43, as described above, the rotational velocity of the relay shaft 56 is increased, and as a result, the rotation of the second shaft 43 can be reversely inputted to the output shaft 54.

Embodiment 4

Figure 10:
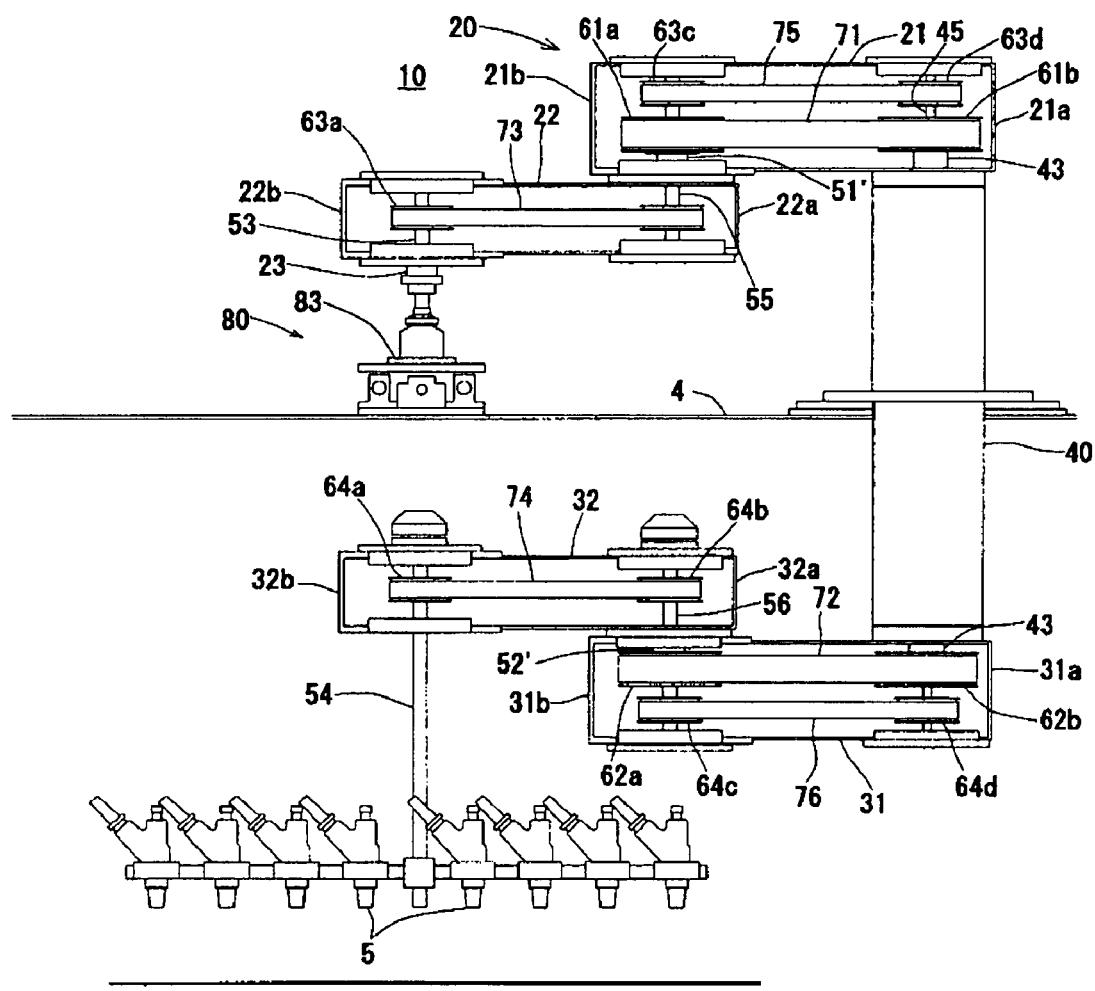
FIG. 10 is a perspective view of a principal portion of another moving mechanism for a blast gun of the present invention.
Figure 11:
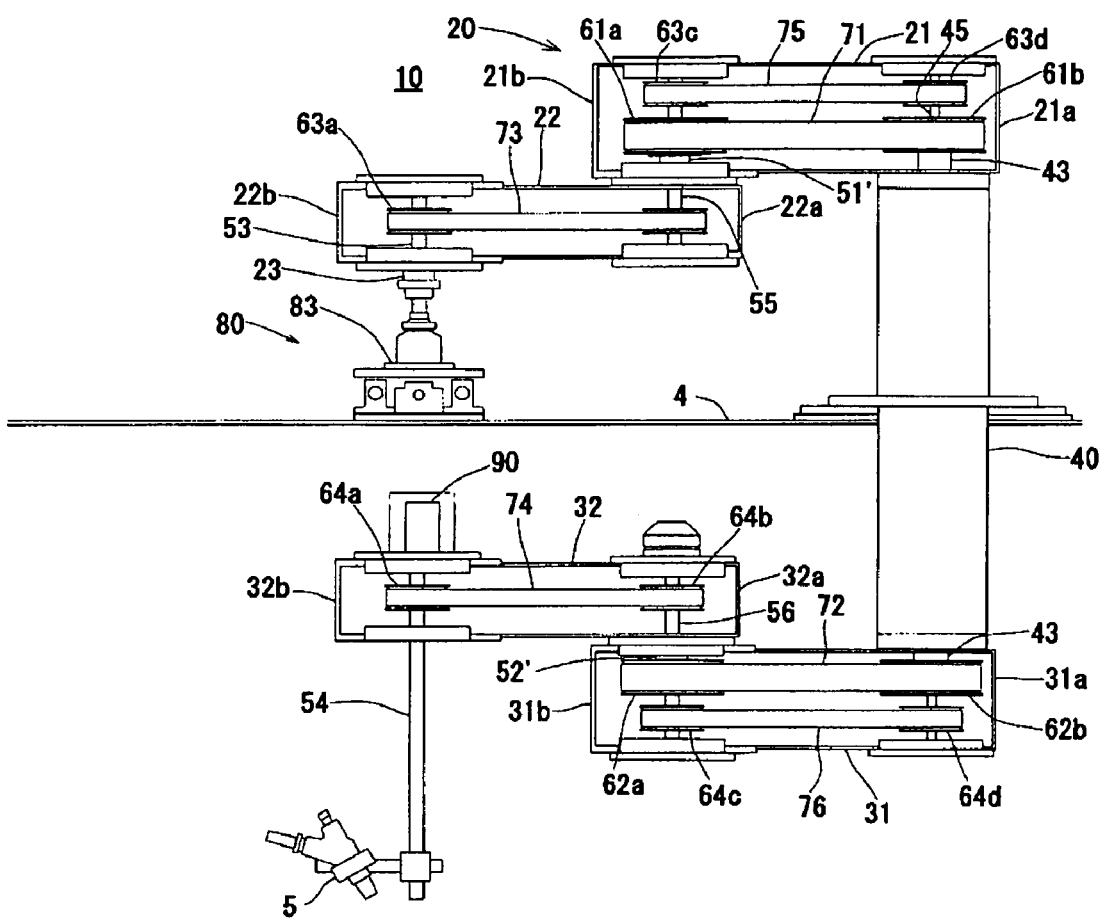
FIG. 11 is a perspective view of a principal portion of still another moving mechanism for a blast gun of the present invention.

As with the moving mechanism for a blast gun described with reference to FIG. 9, a moving mechanism for a blast gun of this embodiment, which will be described with reference to FIGS. 10 and 11, is configured such that the output shaft 54 provided for the output arm 30 can be rotated. That is, in this embodiment, unlike the structure described with reference to FIG. 9, an input shaft 53 is provided in the input portion 23 of the input arm 20 (second input arm 22), and the output shaft 54 is configured to be rotatable in response to the rotation of this input shaft 53.

The movement of the output shaft 54 in conjunction with the movement of this input shaft 53 is performed by four pulleys 63a to 63d provided at the input arm 20 and timing belts 73 and 75 transmitting the power between the pulleys 63a to 63d; the four pulleys 64a to 64d provided at the output arm 30 and the timing belts 74 and 76 transmitting the power between the pulleys 64a to 64d; and a shaft (third shaft) 45 provided for the interlocking unit 40, which transmits the rotation transmitted from the input arm 20 to the output arm 30.

In order to transmit the rotation of the input shaft 53, the pulley 63a is fixed to the input shaft 53 and is configured so as to be rotated in conjunction with the rotation of the input shaft 53.

The pulley 63b wrapped by the timing belt 73, which is also wrapped around the pulley 63a, is fixed to one end (lower end in the drawing) of an input-side relay shaft 55 provided at a pivotal attachment position between the second input arm 22 and the first input arm 21.

Figure 12:
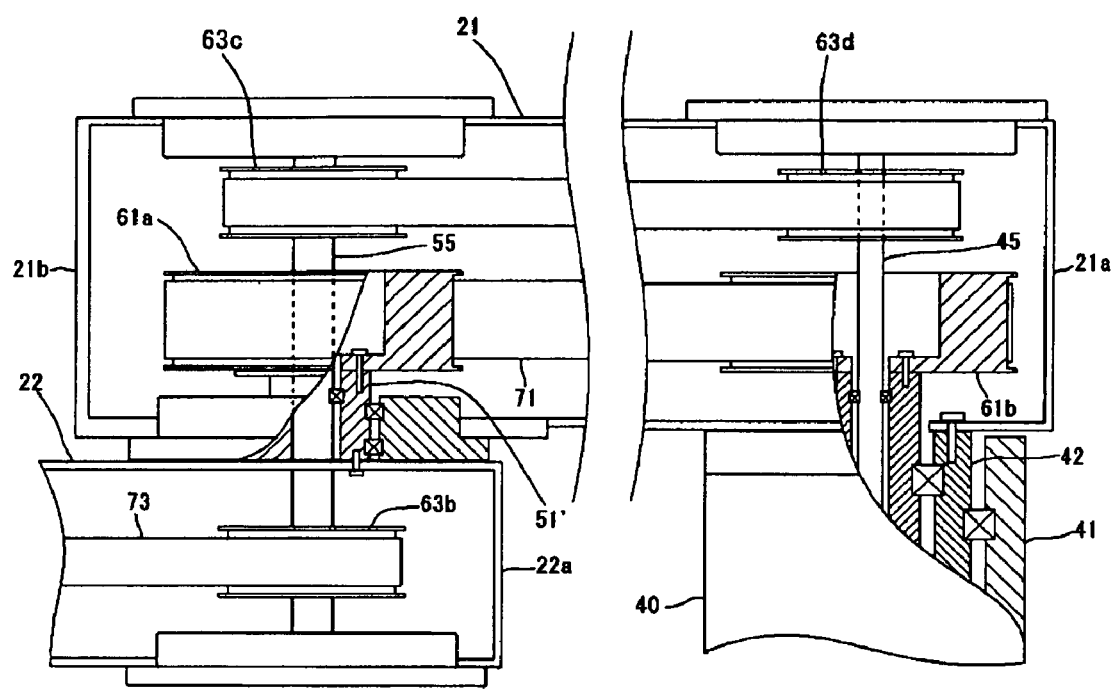
FIG. 12 is a cross-sectional view of a principal portion of an interlocking portion of an input arm and an interlocking portion between the input arm and an interlocking unit shown in FIGS. 10 and 11.

As shown in FIG. 12 by way of example, this input-side relay shaft 55 is provided to penetrate a first rotation shaft 51', which pivotally supports the second input arm 22 with respect to the first input arm 21, and the pulley 61a fixed to this first rotation shaft 51' and is configured to be rotated independently of the first rotation shaft 51'.

In addition, the pulley 63c is fixed to the other end (top end in the drawing) of this input-side relay shaft 55 and is wrapped by the common timing belt 75, together with the pulley 63d fixed to the shaft (third shaft) 45 provided for the interlocking unit 40.

In the embodiment described above with reference to FIG. 4, the interlocking unit 40 is described as having only two shafts, that is, the first and the second shafts; however, the interlocking unit 40 of this embodiment is formed such that, as shown in FIG. 12, three shafts (first to third shafts) 42, 43, and 45, which rotate independently, are provided, and the rotation of the input shaft 53 transmitted at the input arm 20 is transmitted to the output arm 30 through one of the above shafts.

In the illustrated embodiment, the shaft which is disposed at the most central position among the above shafts is regarded as the third shaft, and the pulley 63d is fixed to one end (top end in the example shown in the drawing) of this third shaft 45, so that the rotation of the input shaft transmitted through the pulleys 63a to 63d and the timing belts 73 and 75 is transmitted to the space in the cabinet through the third shaft 45.

As described above, the rotation of the input shaft 53 transmitted in the cabinet 4 through the third shaft 45 is transmitted to the output shaft 54 through the pulleys 64a to 64d and the timing belts 74 and 76, which are provided for the output arm 30 disposed in the cabinet 4.

In order to transmit a rotational driving force by the pulleys 64a to 64d and the timing belts 74 and 76, as with the interlocking portion of the input arm 20 described above, the output-side relay shaft 56, which penetrates the second rotation shaft 52' and which rotates independently of the second rotation shaft 52', is provided at the interlocking portion between the first output arm 31 and the second output arm 32. In addition, the pulley 64c is fixed to the end portion (lower end in the drawing) of this output-side relay shaft 56 at the first output arm side and is wrapped by the timing belt 76 common to the pulley 64d fixed to the third shaft provided for the interlocking unit 40, and the pulley 64b is fixed to the above relay shaft 56 at the second output arm side (top end in the drawing) and is wrapped by the timing belt 74 together with the pulley 64a fixed to the output shaft 54.

As described above, since the power transmission mechanism is provided which transmits the rotation applied to the input shaft 53 provided at the input portion of the input arm 20 to the output shaft 54 provided at the output portion of the output arm 30, when the input shaft 53 is rotated so as to rotate the output shaft 54, the blast gun fitted to this output shaft 54 can be rotated.

Accordingly, for example, as shown in FIG. 10, when a plurality of blast guns 5 are aligned and fitted to the output shaft 54, and the pulleys 63a to 63d and 64a to 64d forming the above power transmission mechanisms are formed to have the same diameter, the output shaft 54 can be rotated in accordance with the rotation direction and the rotation angle inputted to the input shaft 53. For example, according to the structure shown in FIG. 10 by way of example, when the longitudinal direction of a workpiece surface to be processed is disposed in the direction perpendicular to the plane of the figure, the blast guns 5 can be moved while the positional relationship is maintained such that the line of the blast guns 5 is always placed in the direction perpendicular to the longitudinal direction of the workpiece surface.

In addition, as shown in FIG. 11, when the blast gun 5 is fitted so that the ejecting direction thereof is set to be inclined with respect to the axial direction of the output shaft 54, by the rotation of the output shaft 54 in conjunction with the rotation of the input shaft 53, for example, the ejecting direction of an abrasive or the like to the workpiece surface can be changed.

In the illustrated embodiment, the structure is such that the pulleys 63a to 63d and 64a to 64d are formed to have the same diameter, and the output shaft 54 is rotated by the same angle as that of the rotation applied to the input shaft 53; however, the structure may be such that the diameters of the pulleys are changed, and the rotation angle inputted to the input shaft 53 is increased or decreased and is then transmitted to the output shaft 54.

Embodiment 5

In FIG. 11, still another structural example of the moving mechanism for a blast gun 10 of the present invention is shown.

In the embodiment shown in FIG. 11, a motor 90 is provided at the free end 32b of the second output arm 32, and the blast gun 5 is made rotatable in conjunction with the rotation of this motor 90 independently of the rotation caused by a rotational driving force transmitted through the pulleys 61a and 61b, 62a and 62b, 63a to 63d, and 64a to 64d and the timing belts 71 to 76. The remaining structure is similar to the moving mechanism for a blast gun of the Embodiment 4, which was described with reference to FIG. 10, and therefore, a description thereof is omitted.

In the embodiment shown in FIG. 11, in order to rotate the blast gun 5 independently of the rotational driving force transmitted through the pulleys 61a and 61b, 62a and 62b, 63a to 63d, and 64a to 64d, and the timing belts 71 to 76, the motor 90 is provided at the top end of the output shaft 54 to input a rotational driving force to the output shaft 54, to which the blast gun 5 is fitted.

In addition, in order to make the output shaft 54 rotatable by this motor 90, the output shaft 54 and the pulley 64a are interlocked to each other with a clutch mechanism (not shown) interposed therebetween, and when the output shaft 54 is rotated by the motor 90, the output shaft 54 is configured to be separated from a pulley 64a by operating the above clutch mechanism.

With the structure described above, the blast gun 5 can be rotated (rotational movement) in situ by the motor 90. As a result, for example, an operation for changing the ejecting direction of an abrasive to a workpiece surface can be performed, allowing more complicated movement control of the blast gun 5.

As the structure in which the blast gun 5 is rotated in situ as described above, in a device structure including the power transmission mechanism shown in FIG. 10 or 11, as shown in FIG. 2 by way of example, the motor 90 may be provided at the free end 22b of the second input arm 22 so as to rotate the input shaft 53.

In the case described above, in order to make the pulley 63a rotatable independently of the movement of the driving mechanism 80, for example, the input shaft 53 and the driving mechanism 80 are interlocked by a clutch mechanism, and when rotational power is inputted from the motor 90, the driving mechanism 80 and the input shaft 53 are configured to be disconnected.

Embodiment 6

Figure 13:
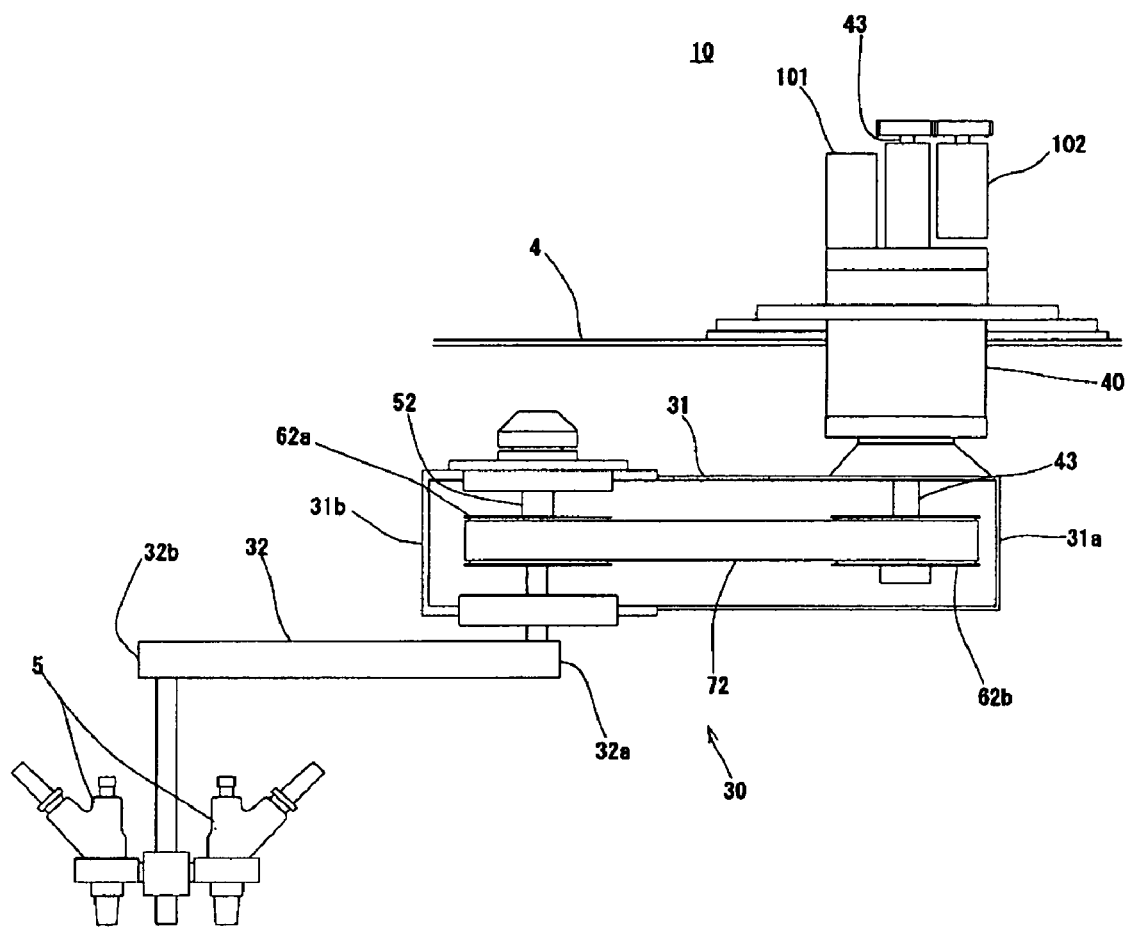
FIG. 13 is a perspective view of a principal portion of yet another moving mechanism for a blast gun of the present invention.

According to all of the moving mechanism for a blast guns described above, as the input means inputting movement to the output arm 30, which is to be performed thereby, a structure is formed so that the input arm 20 having a similar structure to that of the output arm 30 is provided; however, instead of this input arm 20, as shown in FIG. 13, motors 101 and 102, which directly input rotational driving forces to the shafts 42 and 43 provided for the interlocking unit 40, the powers being controlled to obtain respective predetermined rotation angles, may be provided as the input means.

For example, when servo motors are used as the motors 101 and 102 described above, and when the motors 101 and 102 are operated by control signals outputted from an electronic control device or the like (not shown), the output arm 30 can be easily processed by numerical control (NC control) in accordance with a movement pattern programmed beforehand, and hence, a complicated movement pattern can be repeatedly and continuously realized.

In the illustrated embodiment, a structure is shown in which the interlocking unit 40 has only two shafts, that is, the first and the second shafts; however, as in the case of the embodiment shown in FIGS. 10 and 11, the structure may be such that the output shaft 54 is provided for the output arm 30, the third shaft 45 rotating this output shaft 54 is provided for the interlocking unit 40, and a motor inputting a rotational driving force to this third shaft 45 is further provided.

In addition, in the above moving mechanism for a blast gun 10 for a blasting machine according to the present invention comprises the interlocking unit 40 which is provided to penetrate a top plate of the cabinet 4. It is also applied to the construction to have the moving mechanism turn upside down or the interlocking unit 40 of the moving mechanism is disposed in the blasting chamber through lower surface of the cabinet.

Thus the broadest claims that follow are not directed to a machine that is configured in a specific way. Instead, said broadest claims are intended to protect the heart or essence of this breakthrough invention. This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described;
What is claimed is:

1. A moving mechanism for a blast gun for a blasting machine, comprising:
    an output arm which is disposed in a blasting chamber formed in a cabinet and which moves the blast gun; input means which is disposed outside the blasting chamber and which inputs a movement to be performed by the output arm; and an interlocking unit which is provided to penetrate a wall surface of the cabinet to interlock the input means and the output arm,
    wherein the output arm has two arm members which are pivotally attached to each other in such a manner that one member can rotate relative to the other, so that the two output arms are interlocked together,
    the interlocking unit has at least two shafts which are extended inside and outside the cabinet and which are configured to be rotatable by the input means, wherein one of the shafts is located within the other;
    a first arm member of the two arm members is interlocked to a first shaft of the two shafts, and a second arm member which is rotated in conjunction with a second shaft is provided on the first arm member, and
    by the rotation of the first shaft or the rotation of the second shaft, the first arm member or the second arm member is configured to be rotatable synchronously with the rotation of the corresponding shaft.

2. A moving mechanism for a blast gun for a blasting machine, comprising:
    a) an output aim disposed in a blasting chamber formed in a cabinet and which moves the blast gun, the output arm including a first output arm and a second output arm, wherein a first end of the second output arm is pivotally attached to a first end of the first output arm, the pivotal attachment providing that the first output arm can rotate relative to the second output arm and that the two output arms are interlocked together, and the blast gun is fitted to a second end of the second output arm,
    b) input means disposed outside the blasting chamber and which inputs a movement to be performed by the output arm,
    c) an interlocking unit which penetrates a wall surface of the cabinet to interlock the input means and the output arm and transfers the movement from the input means to the output arm by rotation, the interlocking unit including has a casing in which two shafts formed of a first and a second shaft are disposed, inner ends of each of the first and the second shafts are disposed in the blasting chamber and outer ends of the first and the second shafts extend to a space outside the cabinet, and
    d) a first end of the first output arm is fixed to the inner end of the first shaft such that rotation of the first shaft causes the first output arm to move, and the first end of the second output arm is connected to the inner end of the second shaft via a power transmission mechanism such that rotation of the second shaft causes the second output arm to rotate around the pivotal attachment, which serves as a fulcrum.

3. The moving mechanism for a blast gun for a blasting machine, according to claim 2,
    wherein an output shaft to which the blast gun is fitted is rotatably provided at the second end of the second output arm, and a power transmission mechanism is provided which reverses the rotation of the second shaft provided in the interlocking unit and which inputs the rotation to the output shaft.

4. The moving mechanism for a blast gun for a blasting machine, according to claim 2,
    wherein a third shaft which is disposed in the casing is further provided in the interlocking unit, one end of the third shaft being disposed in the blasting chamber formed in the cabinet, and the other end of the third shaft being extended to the space outside the cabinet, and
    an output shaft to which the blast gun is fitted and which is rotatably provided at the second end of the second output arm, and a power transmission mechanism which transmits the rotation of the third shaft to the output shaft are provided for the output arm.

5. The moving mechanism for a blast gun for a blasting machine, according to claim 2, wherein an input arm having two arm members is provided outside the cabinet, and a first input arm and a second input arm of the two arm members are pivotally attached to each other in such a manner that they are rotatable relative to each other, so that the two input arms are interlocked together, the first input arm includes a first end of the first input arm pivotally attached to a first end of the second input arm, and a second end of the first input arm is fixed to the outer end of the first shaft, and the rotation of a shaft provided at the pivotal attachment position with the first input arm caused by the rotation of the second input arm is transmitted through a power transmission mechanism to rotate the second shaft of the interlocking unit.

6. The moving mechanism for a blast gun for a blasting machine, according to claim 3, wherein an input arm having two arm members is provided outside the cabinet, and a first input arm and a second input arm of the two arm members are pivotally attached to each other in such a manner that they are rotatable relative to each other, so that the two input arms are interlocked together, first input arm, includes a first end of the first input arm pivotally attached to a first end of the second input arm, and a second end of the first input arm is fixed to the other outer end of the first shaft, and the rotation of a shaft provided at the pivotal attachment position with the first input arm caused by the rotation of the second input arm is transmitted through a power transmission mechanism to rotate the second shaft of the interlocking unit.

7. The moving mechanism for a blast gun for a blasting machine, according to claim 4, wherein an input arm having two arm members is provided outside the cabinet, and a first input arm and a second input arm of the two arm members are pivotally attached to each other in such a manner that they are rotatable relative to each other, so that the two input arms are interlocked together, first input arm, includes a first end of the first input arm pivotally attached to a first end of the second input arm, and a second end of the first input arm is fixed to the outer end of the first shaft, and the rotation of a shaft provided at the pivotal attachment position with the first input arm caused by the rotation of the second input arm is transmitted through a power transmission mechanism to rotate the second shaft of the interlocking unit.

8. The moving mechanism for a blast gun for a blasting machine, according to claim 4, wherein an input arm, serving as the input means, is provided outside the cabinet, the input arm including: a first input arm fixed at one end thereof to the other end of the first shaft of the interlocking unit; a second input arm pivotally attached at one end thereof to the other end of the first input arm; an input shaft rotatably provided at the other end of the second input arm; a power transmission mechanism rotating the second shaft of the interlocking unit in response to the rotation of the second input arm around the pivotal attachment position serving as a fulcrum; and a power transmission mechanism transmitting the rotation of the input shaft to the third shaft.

9. The moving mechanism for a blast gun for a blasting machine, according to claim 2, wherein motors rotating each of the shafts of the interlocking unit in accordance with inputted electrical signals are provided to form the input means.

10. The moving mechanism for a blast gun for a blasting machine, according to claim 2, wherein one of the first shaft and the second shaft of the interlocking unit is a hollow shaft, and the other shaft is rotatably received in the hollow shaft.

11. The moving mechanism for a blast gun for a blasting machine, according to claim 2, wherein the output arm has an airtight space which accommodates the power transmission mechanism provided for the output arm.

12. The moving mechanism for a blast gun for a blasting machine, according to claim 5, wherein a driving mechanism is provided to move the second end of the second input arm.

13. A moving mechanism for a blast gun for a blasting machine, wherein the moving mechanism for a blast gun according to claim 2 is disposed in the blasting chamber through upper or lower surface of the cabinet perpendicular to the vertical direction.

14. A moving mechanism for a blast gun for a blasting machine, wherein the moving mechanism for a blast gun according to claim 5 is disposed in the blasting chamber through upper or lower surface of the cabinet perpendicular to the vertical direction.

* * * * *